(12) United States Patent
Yoshinaga et al.

(10) Patent No.: US 7,170,247 B2
(45) Date of Patent: Jan. 30, 2007

(54) METHOD OF CONTROL OF MAGNETIC SOUND OF ALTERNATING CURRENT ROTATING MACHINE

(75) Inventors: Soichi Yoshinaga, Nagoya (JP); Kenichi Wakabayashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/100,557

(22) Filed: Apr. 7, 2005

(65) Prior Publication Data

US 2005/0231143 A1    Oct. 20, 2005

(30) Foreign Application Priority Data

Apr. 14, 2004  (JP) .............................. 2004-119467

(51) Int. Cl.
*H02P 6/10* (2006.01)

(52) U.S. Cl. ...................................... 318/448; 318/629

(58) Field of Classification Search ................ 318/127, 318/128, 448, 460, 611, 623, 629
See application file for complete search history.

(56) References Cited

U.S. PATENT DOCUMENTS

| | | | | |
|---|---|---|---|---|
| 4,929,874 | A | * | 5/1990 | Mizuno et al. ............. 318/128 |
| 4,950,966 | A | * | 8/1990 | Moulds, III ................. 318/561 |
| 5,012,174 | A | * | 4/1991 | Adkins et al. .............. 318/649 |
| 5,126,641 | A | * | 6/1992 | Putman et al. .............. 318/128 |
| 5,811,954 | A | * | 9/1998 | Randall ...................... 318/701 |
| 6,404,152 | B1 | | 6/2002 | Kobayashi et al. |
| 6,426,605 | B1 | | 7/2002 | Toliyat et al. |
| 6,515,444 | B1 | | 2/2003 | Jahkonen et al. |

FOREIGN PATENT DOCUMENTS

| | | |
|---|---|---|
| EP | 1 182 771 A2 | 2/2002 |
| EP | 1 292 011 A2 | 3/2003 |
| JP | A 05-176584 | 7/1993 |
| JP | A 11-055986 | 2/1999 |
| JP | A 11-341864 | 12/1999 |
| JP | A 2002-101699 | 4/2002 |
| WO | WO 2004/055967 A1 | 7/2004 |

OTHER PUBLICATIONS

B.P. Lathi, "Signal Processing & Linear Systems", Berleley Cambridge Press, 1998. Chapters 3 and 4 describe Fourier Series and Fourier Transform for converting a time domain spectrum into a frequency domain spectrum.*

* cited by examiner

*Primary Examiner*—Bentsu Ro
(74) *Attorney, Agent, or Firm*—Oliff & Berridge, PLC

(57) ABSTRACT

A method for greatly reducing magnetic sound of an alternating current rotating machine compared with the past comprising superimposing an n−1-th order frequency in inverse turn on a multi-phase alternating current with reference to a basic frequency component of the multi-phase alternating current supplied to an armature of the alternating current rotating machine of multiple phases so as to reduce the n-th order harmonic components of the basic frequency component among radial direction magnetic vibrating forces generated in the radial direction in a core of the alternating current rotating machine.

2 Claims, 33 Drawing Sheets

Fmag: ROTOR MAGNETOMOTIVE FORCE
Fcoil: STATOR MAGNETOMOTIVE FORCE
Icoil: STATOR CURRENT
x: GAP DISTANCE
S: GAP PORTION FACING AREA
$\mu 0$: PERMEABILITY OF AIR

FIG.10

MAGNETIC FLUX:

$$\phi = \frac{F_{mag} + F_{coil}}{2R_g} = \frac{F_{mag} + NI_{coil}}{2R_g} \quad \cdots 1$$

FIG.11

MAGNETIC ENERGY:

$$W = \frac{1}{2}\phi^2 R_g = \frac{1}{8R_g}(F_{mag} + NI_{coil})^2 = \frac{1}{8x}(F_{mag} + NI_{coil})^2 \mu_0 S \quad \cdots 2$$

FIG.12

MAGNETIC VIBRATING FORCE:

$$f = \frac{\partial W}{\partial x} = -\frac{1}{8x^2}\mu_0 S(F_{mag} + NI_{coil})^2 \propto (F_{mag} + NI_{coil})^2 = F_{mag}^2 + 2NF_{mag}I_{coil} + N^2 I_{coil}^2 \quad \cdots 3$$

FIG.13

$$\left.\begin{array}{l}\text{ROTOR MAGNETOMOTIVE FORCE:}\\ F_{mag} = F_1\sin(\theta+\alpha) + F_3\sin 3(\theta+\beta) + F_5\sin 5(\theta+\gamma) + F_7\sin 7(\theta+\delta) \cdots 4\\ \phantom{F_{mag} = }\text{BASIC WAVE} \qquad\quad \text{THIRD ORDER} \qquad\quad \text{FIFTH ORDER} \qquad\quad \text{SEVENTH ORDER}\\ \phantom{F_{mag} = }\text{(FIRST ORDER)}\\[4pt] \text{STATOR CURRENT:}\\ I_{coil} = I_1\sin(\theta+s)\\ \phantom{I_{coil} = }\text{BASIC WAVE}\\ \phantom{I_{coil} = }\text{(FIRST ORDER)}\end{array}\right\}\text{U-PHASE}$$

FIG.14

$$\left.\begin{array}{l}\text{ROTOR MAGNETOMOTIVE FORCE:}\\F_{mag}=F_1\sin(\theta+\alpha-120)+F_3\sin 3(\theta+\beta-120)+F_5\sin 5(\theta+\gamma-120)+F_7\sin 7(\theta+\delta-120)\\\text{STATOR CURRENT:}\\I_{coil}=I_1\sin(\theta+s-120)\end{array}\right\}\text{V-PHASE} \quad \cdots 5$$

FIG.15

W-PHASE
{
ROTOR MAGNETOMOTIVE FORCE:
$F_{mag} = F_1\sin(\theta+\alpha-240) + F_3\sin3(\theta+\beta-240) + F_5\sin5(\theta+\gamma-240) + F_7\sin7(\theta+\delta-240)$ ...6

STATOR CURRENT:
$I_{coil} = I_1\sin(\theta+s-240)$
}

FIG.16

U-PHASE VIBRATING FORCE $fu \propto$ $$\frac{1}{2}(F_1^2 + F_3^2 + F_5^2 + F_7^2) - \frac{F_1^2}{2}\cos 2(\theta+\alpha) - \frac{F_3^2}{2}\cos 6(\theta+\beta) - \frac{F_5^2}{2}\cos 10(\theta+\gamma) - \frac{F_7^2}{2}\cos 14(\theta+\delta)$$

$$- F_1 F_3 [\cos\{4\theta+\alpha+3\beta\} - \cos\{2\theta-\alpha+3\beta\}] - F_1 F_5 [\cos\{6\theta+\alpha+5\gamma\} - \cos\{4\theta-\alpha+5\gamma\}]$$

$$- F_1 F_7 [\cos\{8\theta+\alpha+7\delta\} - \cos\{6\theta-\alpha+7\delta\}] - F_3 F_5 [\cos\{8\theta+3\beta+5\gamma\} - \cos\{2\theta-3\beta+5\gamma\}]$$

$$- F_3 F_7 [\cos\{10\theta+3\beta+7\delta\} - \cos\{4\theta-3\beta+7\delta\}] - F_5 F_7 [\cos\{2\theta+5\gamma+7\delta\} - \cos\{2\theta-5\gamma+7\delta\}]$$

$$+ 2N \left\{ \frac{F_1 I_1}{2} \{\cos(2\theta+\alpha+s) - \cos(\alpha-s)\} - \frac{F_3 I_1}{2}[\cos\{4\theta+3\beta+s\} - \cos\{2\theta+3\beta-s\}] \right.$$

$$\left. \frac{F_5 I_1}{2}[\cos\{6\theta+5\gamma+s\} - \cos\{4\theta+5\gamma-s\}] - \frac{F_7 I_1}{2}[\cos\{8\theta+7\delta+s\} - \cos\{6\theta+7\delta-s\}] \right\}$$

$$+ N^2 \left\{ \frac{1}{2}I_1^2 - \frac{I_1^2}{2}\cos 2(\theta+s) \right\} \quad \cdots 7$$

FIG.17

V-PHASE VIBRATING FORCE $f_V \propto$ $$\frac{1}{2}(F_1^2 + F_3^2 + F_5^2 + F_7^2) - \frac{F_1^2}{2}\cos 2(\theta+\alpha-120) - \frac{F_3^2}{2}\cos 6(\theta+\beta-120) - \frac{F_5^2}{2}\cos 10(\theta+\gamma-120) - \frac{F_7^2}{2}\cos 14(\theta+\delta-120)$$

$$- F_1 F_3 [\cos\{4\theta+\alpha+3\beta-480\} - \cos\{2\theta-\alpha+3\beta-240\}] - F_1 F_5 [\cos\{6\theta+\alpha+5\gamma-720\} - \cos\{4\theta-\alpha+5\gamma-480\}]$$

$$- F_1 F_7 [\cos\{8\theta+\alpha+7\delta-960\} - \cos\{6\theta-\alpha+7\delta-720\}] - F_3 F_5 [\cos\{8\theta+3\beta+5\gamma-960\} - \cos\{2\theta-3\beta+5\gamma-240\}]$$

$$- F_3 F_7 [\cos\{10\theta+3\beta+7\delta-1200\} - \cos\{4\theta-3\beta+7\delta-480\}] - F_5 F_7 [\cos\{12\theta+5\gamma+7\delta-1440\} - \cos\{2\theta-5\gamma+7\delta-240\}]$$

$$+ 2N \left\{ \frac{F_1 I_1}{2} [\cos\{2\theta+\alpha+s-240\} - \cos(\alpha-s)] - \frac{F_3 I_1}{2} [\cos\{4\theta+3\beta+s-480\} - \cos\{2\theta+3\beta-s-240\}] \right.$$

$$\left. \frac{F_5 I_1}{2} [\cos\{6\theta+5\gamma+s-720\} - \cos\{4\theta+5\gamma-s-480\}] \frac{F_7 I_1}{2} [\cos\{8\theta+7\delta+s-960\} - \cos\{6\theta+7\delta-s-720\}] \right\}$$

$$+ N^2 \left\{ \frac{1}{2} I_1^2 - \frac{I_1^2}{2}\cos 2(\theta+s-120) \right\} \quad \cdots 8$$

FIG.18

W-PHASE VIBRATING FORCE $fw \propto$ $$\frac{1}{2}(F_1^2 + F_3^2 + F_5^2 + F_7^2) \frac{F_1^2}{2}\cos(2\theta + \alpha - 240°) \frac{F_3^2}{2}\cos(6\theta + \beta - 240°) \frac{F_5^2}{2}\cos10(\theta + \gamma - 240°) \frac{F_7^2}{2}\cos14(\theta + \delta - 240°)$$

$$-F_1 F_3[\cos(4\theta + \alpha + 3\beta - 96°) - \cos(2\theta - \alpha + \beta - 48°)] - F_1 F_5[\cos(6\theta + \alpha + 5\gamma - 144°) - \cos(4\theta - \alpha + 5\gamma - 96°)]$$

$$-F_1 F_7[\cos(8\theta + \alpha + 7\delta - 192°) - \cos(6\theta - \alpha + 7\delta - 144°)] - F_3 F_5[\cos(8\theta + 3\beta + 5\gamma - 192°) - \cos(2\theta - 3\beta + 5\gamma - 48°)]$$

$$-F_3 F_7[\cos(10\theta + 3\beta + 7\delta - 240°) - \cos(4\theta - 3\beta + 7\delta - 96°)] - F_5 F_7[\cos(12\theta + 5\gamma + 7\delta - 288°) - \cos(2\theta - 5\gamma + 7\delta - 48°)]$$

$$+2N \left\{ \frac{F_1 I_1}{2} \{\cos(2\theta + \alpha + s - 48°) - \cos(\alpha - s)\} \frac{F_3 I_1}{2}[\cos(4\theta + 3\beta + s - 96°) - \cos(2\theta + 3\beta - s - 48°)] \right.$$

$$\left. \frac{F_5 I_1}{2}[\cos(6\theta + 5\gamma + s - 144°) - \cos(4\theta + 5\gamma - s - 96°)] \frac{F_7 I_1}{2}[\cos(8\theta + 7\delta + s - 192°) - \cos(6\theta + 7\delta - s - 144°)] \right\}$$

$$+N^2 \left\{ \frac{1}{2} I_1^2 \frac{I_1^2}{2} \cos(2\theta + s - 240°) \right\} \ldots 9$$

FIG.19

$$fu + fv + fw \propto$$

$$\underbrace{\frac{3}{2}(F_1^2 + F_3^2 + F_5^2 + F_7^2) + 3NF_1 I_1 \cos(\alpha - s)}_{(1)} + \underbrace{\frac{3N^2}{2} I_1^2}_{} - \underbrace{\frac{3F_3^2}{2} \cos 6(\theta + \beta)}_{(2)} - \underbrace{3F_1 F_5 \cos(6\theta + \alpha + 5\gamma)}_{(3)}$$

$$+ \underbrace{3F_1 F_7 \cos(6\theta - \alpha + 7\delta)}_{(4)} - \underbrace{3F_5 F_7 \cos(12\theta + 5\gamma + 7\delta)}_{(5)} + 3N\Big\{ \underbrace{-F_5 I_1 \cos(6\theta + 5\gamma + s)}_{(6)} + \underbrace{F_7 I_1 \cos(6\theta + 7\delta - s)}_{(7)} \Big\}$$

U-PHASE {

ROTOR MAGNETOMOTIVE FORCE:
$$F_{mag} = F_1\sin(\theta+\alpha) + F_j\sin j(\theta+\beta) + F_k\sin k(\theta+\gamma) + F_l\sin l(\theta+\delta)$$
　　　　BASIC WAVE　　　j-TH ORDER　　k-TH ORDER　　L-TH ORDER
　　　(FIRST ORDER)

STATOR CURRENT:
$$I_{coil} = I_1\sin(\theta+s) + I_m\sin m(\theta+t) + I_n\sin n(\theta+u)$$
　　　　BASIC WAVE　　　m-TH ORDER　　n-TH ORDER
　　　(FIRST ORDER)

V-PHASE $\begin{cases} \text{ROTOR MAGNETOMOTIVE FORCE:} \\ F_{mag} = F_1\sin(\theta+\alpha-120)+F_j\sin j(\theta+\beta-120)+F_k\sin k(\theta+\gamma-120)+F_l\sin l(\theta+\delta-120) \\ \text{STATOR CURRENT:} \\ I_{coil} = I_1\sin(\theta+s-120)+I_m\sin\{m(\theta+t)-240\}+I_n\sin\{n(\theta+u)-240\} \end{cases}$ $\cdots 12$

FIG.22

W-PHASE
$\begin{cases} \text{ROTOR MAGNETOMOTIVE FORCE:} \\ F_{mag} = F_1 \sin(\theta + \alpha - 240) + F_j \sin j(\theta + \beta - 240) + F_k \sin k(\theta + \gamma - 240) + F_l \sin l(\theta + \delta - 240) \\ \text{STATOR CURRENT:} \\ I_{coil} = I_1 \sin(\theta + s - 240) + I_m \sin\{m(\theta + t) - 120\} + I_n \sin\{n(\theta + u) - 120\} \end{cases}$

U-PHASE VIBRATING FORCE $fu \propto$ $$\frac{1}{2}(F_1^2 + F_j^2 + F_k^2 + F_l^2) - \frac{F_j^2}{2}\cos 2j(\theta+\beta) - \frac{F_k^2}{2}\cos 2k(\theta+\gamma) - \frac{F_l^2}{2}\cos 2l(\theta+\delta)$$

$$-F_1 F_j [\cos\{(j+1)\theta+\alpha+j\beta\} - \cos\{(j-1)\theta-\alpha+j\beta\}] - F_1 F_k [\cos\{(k+1)\theta+\alpha+k\gamma\} - \cos\{(k-1)\theta-\alpha+k\gamma\}]$$

$$-F_1 F_l [\cos\{(l+1)\theta+\alpha+l\delta\} - \cos\{(l-1)\theta-\alpha+l\delta\}] - F_j F_k [\cos\{(k+j)\theta+j\beta+k\gamma\} - \cos\{(k-j)\theta-j\beta+k\gamma\}]$$

$$-F_j F_l [\cos\{(l+j)\theta+j\beta+l\delta\} - \cos\{(l-j)\theta-j\beta+l\delta\}] - F_k F_l [\cos\{(l+k)\theta+k\gamma+l\delta\} - \cos\{(l-k)\theta-k\gamma+l\delta\}]$$

$$+2N \left\{ \begin{array}{l} -\dfrac{F_1 I_1}{2}\{\cos(2\theta+\alpha+s) - \cos(\alpha-s)\} - \dfrac{F_1 I_m}{2}[\cos\{(m+1)\theta+\alpha+mt\} - \cos\{(m-1)\theta-\alpha+mt\}] \\[4pt] -\dfrac{F_1 I_n}{2}[\cos\{(n+1)\theta+\alpha+nu\} - \cos\{(n-1)\theta-\alpha+nu\}] - \dfrac{F_j I_1}{2}[\cos\{(j+1)\theta+j\beta+s\} - \cos\{(j-1)\theta+j\beta-s\}] \\[4pt] -\dfrac{F_j I_m}{2}[\cos\{(j+m)\theta+j\beta+mt\} - \cos\{(j-m)\theta+j\beta-mt\}] - \dfrac{F_j I_n}{2}[\cos\{(j+n)\theta+j\beta+nu\} - \cos\{(j-n)\theta+j\beta-nu\}] \\[4pt] -\dfrac{F_k I_1}{2}[\cos\{(k+1)\theta+k\gamma+s\} - \cos\{(k-1)\theta+k\gamma-s\}] - \dfrac{F_k I_m}{2}[\cos\{(k+m)\theta+k\gamma+mt\} - \cos\{(k-m)\theta+k\gamma-mt\}] \\[4pt] -\dfrac{F_k I_n}{2}[\cos\{(k+n)\theta+k\gamma+nu\} - \cos\{(k-n)\theta+k\gamma-nu\}] - \dfrac{F_l I_1}{2}[\cos\{(l+1)\theta+l\delta+s\} - \cos\{(l-1)\theta+l\delta-s\}] \\[4pt] -\dfrac{F_l I_m}{2}[\cos\{(l+m)\theta+l\delta+mt\} - \cos\{(l-m)\theta+l\delta-mt\}] - \dfrac{F_l I_n}{2}[\cos\{(l+n)\theta+l\delta+nu\} - \cos\{(l-n)\theta+l\delta-nu\}] \end{array} \right.$$

$$+ N^2 \left\{ \frac{1}{2}(I_1^2 + I_m^2 + I_n^2) - \frac{I_m^2}{2}\cos 2m(\theta+t) - \frac{I_n^2}{2}\cos 2n(\theta+u) - I_1 I_m [\cos\{(m+1)\theta+s+mt\} - \cos\{(m-1)\theta-s+mt\}] \right.$$

$$\left. - \frac{I_1^2}{2}\cos 2(\theta+s) - \frac{I_m^2}{2}\cos 2m(\theta+t) - \frac{I_n^2}{2}\cos 2n(\theta+u) \right.$$

$$\left. - I_1 I_n [\cos\{(n+1)\theta+s+nu\} - \cos\{(n-1)\theta-s+nu\}] - I_m I_n [\cos\{(m+n)\theta+mt+nu\} - \cos\{(m-n)\theta+mt-nu\}] \right\}$$

V-PHASE VIBRATING FORCE $fv \propto$ $\frac{1}{2}(F_1^2 + F_j^2 + F_k^2 + F_l^2) \frac{F_i^2}{2} \cos 2(\theta + \alpha - 120) \frac{F_j^2}{2} \cos 2j(\theta + \beta - 120) \frac{F_k^2}{2} \cos 2k(\theta + \gamma - 120) \frac{F_l^2}{2} \cos 2l(\theta + \delta - 120)$ $-F_i F_j [\cos\{(j+1)\theta + \alpha + j\beta - 120(j+1)\} - \cos\{(j-1)\theta - \alpha + j\beta - 120(j-1)\}] - F_i F_k [\cos\{(k+1)\theta + \alpha + k\gamma - 120(k+1)\} - \cos\{(k-1)\theta - \alpha + k\gamma - 120(k-1)\}]$ $-F_i F_l [\cos\{(l+1)\theta + \alpha + l\delta - 120(l+1)\} - \cos\{(l-1)\theta - \alpha + l\delta - 120(l-1)\}] - F_j F_k [\cos\{(k+j)\theta + j\beta + k\gamma - 120(k+j)\} - \cos\{(k-j)\theta - j\beta + k\gamma - 120(k-j)\}]$ $-F_j F_l [\cos\{(l+j)\theta + j\beta + l\delta - 120(l+j)\} - \cos\{(l-j)\theta - j\beta + l\delta - 120(l-j)\}] - F_k F_l [\cos\{(l+k)\theta + k\gamma + l\delta - 120(l+k)\} - \cos\{(l-k)\theta - k\gamma + l\delta - 120(l-k)\}]$ $+2N\left\{\begin{array}{l}\frac{F_i I_1}{2}[\cos 2\theta + \alpha + s - 240 - \cos(\alpha - s)] \frac{F_i I_m}{2}[\cos\{(m+1)\theta + \alpha + mt\} - \cos\{(m-1)\theta - \alpha + mt - 120\}] \\ \frac{F_i I_n}{2}[\cos\{(n+1)\theta + \alpha + nu\} - \cos\{(n-1)\theta - \alpha + nu - 120\}] \frac{F_j I_1}{2}[\cos\{(j+1)\theta + j\beta + s - 120(j+1)\} - \cos\{(j-1)\theta + j\beta - s - 120(j-1)\}] \\ \frac{F_j I_m}{2}[\cos\{(j+m)\theta + j\beta + mt - 120(j+2)\} - \cos\{(j-m)\theta + j\beta - mt - 120(j-2)\}] \frac{F_j I_n}{2}[\cos\{(j+n)\theta + j\beta + nu - 120(j+2)\} - \cos\{(j-n)\theta + j\beta - nu - 120(j-2)\}] \\ \frac{F_k I_1}{2}[\cos\{(k+1)\theta + k\gamma + s - 120(k+1)\} - \cos\{(k-1)\theta + k\gamma - s - 120(k-1)\}] \frac{F_k I_m}{2}[\cos\{(k+m)\theta + k\gamma + mt - 120(k+2)\} - \cos\{(k-m)\theta + k\gamma - mt - 120(k-2)\}] \\ \frac{F_k I_n}{2}[\cos\{(k+n)\theta + k\gamma + nu - 120(k+2)\} - \cos\{(k-n)\theta + k\gamma - nu - 120(k-2)\}] \frac{F_l I_1}{2}[\cos\{(l+1)\theta + l\delta + s - 120(l+1)\} - \cos\{(l-1)\theta + l\delta - s - 120(l-1)\}] \\ \frac{F_l I_m}{2}[\cos\{(l+m)\theta + l\delta + mt - 120(l+2)\} - \cos\{(l-m)\theta + l\delta - mt - 120(l-2)\}] \frac{F_l I_n}{2}[\cos\{(l+n)\theta + l\delta + nu - 120(l+2)\} - \cos\{(l-n)\theta + l\delta - nu - 120(l-2)\}]\end{array}\right\}$ $+N^2 \left\{\frac{1}{2}(I_1^2 + I_m^2 + I_n^2) \frac{I_1^2}{2} \cos 2(\theta + s - 120) \frac{I_m^2}{2} \cos 2m(\theta + t) \frac{I_n^2}{2} \cos 2n(\theta + u) - 120) - I_1 I_m [\cos\{(m+1)\theta + s + mt\} - \cos\{(m-1)\theta - s + mt - 120\}] \right.$ $\left. - I_1 I_n [\cos\{(n+1)\theta + s + nu\} - \cos\{(n-1)\theta - s + nu - 120\}] - I_m I_n [\cos\{(m+n)\theta + mt + nu - 120\} - \cos\{(m-n)\theta + mt - nu\}]\right\}$ ...15

FIG. 25

W-PHASE VIBRATING FORCE $f_W \propto$ $$\begin{aligned}
& \frac{1}{2}(F_1^2 + F_j^2 + F_k^2 + F_l^2) \frac{F_j^2}{2}\cos 2(\theta+\alpha-24\phi) \frac{F_j^2}{2}\cos 2j(\theta+\beta-24\phi) \frac{F_k^2}{2}\cos 2k(\theta+\gamma-24\phi) \frac{F_l^2}{2}\cos 2l(\theta+\delta-24\phi) \\
& -F_1 F_j[\cos\{(j+1)\theta+\alpha+j\beta-24\phi(j+1)\} - \cos\{(j-1)\theta-\alpha+j\beta-24\phi(j-1)\}] - F_1 F_k[\cos\{(k+1)\theta+\alpha+k\gamma-24\phi(k+1)\} - \cos\{(k-1)\theta-\alpha+k\gamma-24\phi(k-1)\}] \\
& -F_1 F_l[\cos\{(l+1)\theta+\alpha+l\delta-24\phi(l+1)\} - \cos\{(l-1)\theta-\alpha+l\delta-24\phi(l-1)\}] - F_j F_k[\cos\{(k+j)\theta+j\beta+k\gamma-24\phi(k+j)\} - \cos\{(k-j)\theta-j\beta+k\gamma-24\phi(k-j)\}] \\
& -F_j F_l[\cos\{(l+j)\theta+j\beta+l\delta-24\phi(l+j)\} - \cos\{(l-j)\theta-j\beta+l\delta-24\phi(l-j)\}] - F_k F_l[\cos\{(l+k)\theta+k\gamma+l\delta-24\phi(l+k)\} - \cos\{(l-k)\theta-k\gamma+l\delta-24\phi(l-k)\}] \\
& +2N\left\{ \frac{F_1 I_1}{2}\{\cos(2\theta+\alpha+s-48\phi)-\cos(\alpha-s)\} \frac{F_1 I_m}{2}[\cos\{(m+1)\theta+\alpha+mt\}-\cos\{(m-1)\theta-\alpha+mt+12\phi\}] \frac{F_j I_1}{2}[\cos\{(j+1)\theta+j\beta+s-24\phi(j+1)\}-\cos\{(j-1)\theta+j\beta-s-24\phi(j-1)\}] \right. \\
& \frac{F_1 I_n}{2}[\cos\{(n+1)\theta+\alpha+nu+12\phi\}-\cos\{(n-1)\theta-\alpha+nu+12\phi\}] \\
& \frac{F_j I_m}{2}[\cos\{(j+m)\theta+j\beta+mt-12\phi(2j-1)\}-\cos\{(j-m)\theta+j\beta-mt-12\phi(2j-1)\}] \frac{F_k I_m}{2}[\cos\{(k+m)\theta+k\gamma+mt-12\phi(2k+1)\}-\cos\{(k-m)\theta+k\gamma-mt-12\phi(2k-1)\}] \\
& \frac{F_j I_n}{2}[\cos\{(j+n)\theta+j\beta+nu-12\phi(2j+1)\}-\cos\{(j-n)\theta+j\beta-nu-12\phi(2j-1)\}] \\
& \frac{F_k I_1}{2}[\cos\{(k+1)\theta+k\gamma+s-24\phi(k+1)\}-\cos\{(k-1)\theta+k\gamma-s-24\phi(k-1)\}] \frac{F_l I_1}{2}[\cos\{(l+1)\theta+l\delta+s-24\phi(l+1)\}-\cos\{(l-1)\theta+l\delta-s-24\phi(l-1)\}] \\
& \frac{F_k I_n}{2}[\cos\{(k+n)\theta+k\gamma+nu-12\phi(2k+1)\}-\cos\{(k-n)\theta+k\gamma-nu-12\phi(2k-1)\}] \frac{F_l I_n}{2}[\cos\{(l+n)\theta+l\delta+nu-12\phi(2l+1)\}-\cos\{(l-n)\theta+l\delta-nu-12\phi(2l-1)\}] \\
& \left. \frac{F_l I_m}{2}[\cos\{(l+m)\theta+l\delta+mt-12\phi(2l+1)\}-\cos\{(l-m)\theta+l\delta-mt-12\phi(2l-1)\}] \right\} \\
& +N^2 \left\{ \frac{1}{2}(I_1^2 + I_m^2 + I_n^2) \frac{I_1^2}{2}\cos 2(\theta+s-24\phi) \frac{I_m^2}{2}\cos 2m(\theta+t) \frac{I_n^2}{2}\cos 2n(\theta+u)-24\phi)-I_1 I_m[\cos\{(m+1)\theta+s+mt\}-\cos\{(m-1)\theta-s+mt+12\phi\}] \right. \\
& \left. -I_1 I_n[\cos\{(n+1)\theta+s+nu\}-\cos\{(n-1)\theta-s+nu+12\phi\}] -I_m I_n[\cos\{(m+n)\theta+mt+nu-24\phi\}-\cos\{(m-n)\theta+mt-nu\}] \right\} \quad \cdots 16
\end{aligned}$$

FIG.26

$$\left. \begin{array}{l} \text{ROTOR MAGNETOMOTIVE FORCE:} \\ F_{mag} = F_1 \sin(\theta + \alpha) + F_3 \sin 3(\theta + \beta) + F_5 \sin 5(\theta + \gamma) + F_7 \sin 7(\theta + \delta) \\ \text{STATOR CURRENT:} \\ I_{coil} = I_1 \sin(\theta + s) + I_5 \sin 5(\theta + t) + I_{11} \sin 11(\theta + u) \end{array} \right\} \text{U-PHASE} \quad \cdots 17$$

FIG. 27

V-PHASE $\begin{cases} \text{ROTOR MAGNETOMOTIVE FORCE:} \\ F_{mag} = F_1 \sin(\theta + \alpha - 120) + F_3 \sin 3(\theta + \beta - 120) + F_5 \sin 5(\theta + \gamma - 120) + F_7 \sin 7(\theta + \delta - 120) \\ \text{STATOR CURRENT:} \\ I_{coil} = I_1 \sin(\theta + s - 120) + I_5 \sin\{5(\theta + t) - 240\} + I_{11} \sin\{11(\theta + u) - 240\} \end{cases}$ $\cdots 18$

FIG. 28

W-PHASE $\begin{cases} \text{ROTOR MAGNETOMOTIVE FORCE:} \\ F_{mag} = F_1\sin(\theta+\alpha-240)+F_3\sin3(\theta+\beta-240)+F_5\sin5(\theta+\gamma-240)+F_7\sin7(\theta+\delta-240) \\ \text{STATOR CURRENT:} \\ I_{coil} = I_1\sin(\theta+s-240)+I_5\sin\{5(\theta+t)-120\}+I_{11}\sin\{11(\theta+u)-120\} \end{cases}$

U-PHASE VIBRATING FORCE $fu \propto$ $$\frac{1}{2}(F_1^2 + F_3^2 + F_5^2 + F_7^2) - \frac{F_1^2}{2}\cos 2(\theta+\alpha) - \frac{F_3^2}{2}\cos 6(\theta+\beta) - \frac{F_5^2}{2}\cos 10(\theta+\gamma) - \frac{F_7^2}{2}\cos 14(\theta+\delta)$$

$$-F_1 F_3 \left[\cos\{4\theta+\alpha+3\beta\} - \cos\{2\theta-\alpha+3\beta\}\right] - F_1 F_5 \left[\cos\{6\theta+\alpha+5\gamma\} - \cos\{4\theta-\alpha+5\gamma\}\right]$$

$$-F_1 F_7 \left[\cos\{8\theta+\alpha+7\delta\} - \cos\{6\theta-\alpha+7\delta\}\right] - F_3 F_5 \left[\cos\{8\theta+3\beta+5\gamma\} - \cos\{2\theta-3\beta+5\gamma\}\right]$$

$$-F_3 F_7 \left[\cos\{10\theta+3\beta+7\delta\} - \cos\{4\theta-3\beta+7\delta\}\right] - F_5 F_7 \left[\cos\{2\theta+5\gamma+7\delta\} - \cos\{2\theta-5\gamma+7\delta\}\right]$$

$$+ 2N \left\{ \begin{array}{l} -\dfrac{F_1 I_1}{2}\{\cos\{2\theta+\alpha+s\} - \cos(\alpha-s)\} - \dfrac{F_1 I_5}{2}\left[\cos\{6\theta+\alpha+5t\} - \cos\{4\theta-\alpha+5t\}\right] \\[4pt] -\dfrac{F_1 I_{11}}{2}\left[\cos\{12\theta+\alpha+11u\} - \cos\{10\theta-\alpha+11u\}\right] - \dfrac{F_3 I_5}{2}\left[\cos\{8\theta+3\beta+5t\} - \cos\{2\theta-3\beta+5t\}\right] \\[4pt] -\dfrac{F_3 I_{11}}{2}\left[\cos\{14\theta+3\beta+11u\} - \cos\{8\theta-3\beta+11u\}\right] - \dfrac{F_5 I_1}{2}\left[\cos\{6\theta+5\gamma+s\} - \cos\{4\theta+5\gamma-s\}\right] \\[4pt] -\dfrac{F_5 I_{11}}{2}\left[\cos\{16\theta+5\gamma+11u\} - \cos\{6\theta-5\gamma+11u\}\right] - \dfrac{F_7 I_1}{2}\left[\cos\{8\theta+7\delta+s\} - \cos\{6\theta+7\delta-s\}\right] \\[4pt] -\dfrac{F_7 I_5}{2}\left[\cos\{2\theta+7\delta+5t\} - \cos\{2\theta+7\delta-5t\}\right] - \dfrac{F_7 I_{11}}{2}\left[\cos\{18\theta+7\delta+11u\} - \cos\{4\theta-7\delta+11u\}\right] \end{array} \right.$$

$$+ N^2 \left\{ \begin{array}{l} \dfrac{1}{2}(I_1^2 + I_5^2 + I_{11}^2) - \dfrac{I_1^2}{2}\cos 2(\theta+s) - \dfrac{I_5^2}{2}\cos 10(\theta+t) - \dfrac{I_{11}^2}{2}\cos 22(\theta+u) - I_1 I_5 \left[\cos\{6\theta+s+5t\} - \cos\{4\theta-s+5t\}\right] \\[4pt] - I_1 I_{11}\left[\cos\{2\theta+s+11u\} - \cos\{10\theta-s+11u\}\right] - I_5 I_{11}\left[\cos\{16\theta+5t+11u\} - \cos\{6\theta-5t+11u\}\right] \end{array} \right.$$

V-PHASE VIBRATING FORCE $fv \propto$ $\frac{1}{2}(F_1^2 + F_3^2 + F_5^2 + F_7^2) - \frac{F_1^2}{2}\cos2(\theta+\alpha-120) - \frac{F_3^2}{2}\cos6(\theta+\beta-120) - \frac{F_5^2}{2}\cos10(\theta+\gamma-120) - \frac{F_7^2}{2}\cos14(\theta+\delta-120)$ $- F_1 F_3 [\cos\{4\theta+\alpha+3\beta-120\} - \cos\{2\theta-\alpha+3\beta-240\}] - F_1 F_5 [\cos\{6\theta+\alpha+5\gamma\} - \cos\{4\theta-\alpha+5\gamma-120\}]$ $- F_1 F_7 [\cos\{8\theta+\alpha+7\delta-240\} - \cos\{6\theta-\alpha+7\delta\}] - F_3 F_5 [\cos\{8\theta+3\beta+5\gamma-240\} - \cos\{2\theta-3\beta+5\gamma-240\}]$ $- F_3 F_7 [\cos\{10\theta+3\beta+7\delta-120\} - \cos\{4\theta-3\beta+7\delta-120\}] - F_5 F_7 [\cos\{12\theta+5\gamma+7\delta\} - \cos\{2\theta-5\gamma+7\delta-240\}]$ $+ 2N \begin{cases} -\dfrac{F_1 I_1}{2}[\cos\{2\theta+\alpha+s+t\} - \cos(\alpha-s)] - \dfrac{F_1 I_5}{2}[\cos\{6\theta+\alpha+5t\} - \cos\{4\theta-\alpha+5t-120\}] \\ -\dfrac{F_1 I_{11}}{2}[\cos\{12\theta+\alpha+11u\} - \cos\{10\theta-\alpha+11u-120\}] - \dfrac{F_3 I_1}{2}[\cos\{4\theta+3\beta+s-120\} - \cos\{2\theta+3\beta-s-240\}] \\ -\dfrac{F_3 I_5}{2}[\cos\{8\theta+3\beta+5t-240\} - \cos\{2\theta-3\beta+5t+120\}] - \dfrac{F_3 I_{11}}{2}[\cos\{14\theta+3\beta+11u-240\} - \cos\{8\theta-3\beta+11u+120\}] \\ -\dfrac{F_5 I_1}{2}[\cos\{6\theta+5\gamma+s\} - \cos\{4\theta+5\gamma-s-120\}] - \dfrac{F_5 I_5}{2}[\cos\{10\theta+5\gamma+5t-120\} - \cos\{5\gamma-5t\}] \\ -\dfrac{F_5 I_{11}}{2}[\cos\{16\theta+5\gamma+11u-120\} - \cos\{6\theta-5\gamma+11u\}] - \dfrac{F_7 I_1}{2}[\cos\{8\theta+7\delta+s-240\} - \cos\{6\theta+7\delta-s\}] \\ -\dfrac{F_7 I_5}{2}[\cos\{12\theta+7\delta+5t\} - \cos\{2\theta+7\delta-5t-240\}] - \dfrac{F_7 I_{11}}{2}[\cos\{18\theta+7\delta+11u+240\} - \cos\{4\theta-7\delta+11u+240\}] \end{cases}$ $+ N^2 \begin{cases} \dfrac{1}{2}(I_1^2 + I_5^2 + I_{11}^2) - \dfrac{I_1^2}{2}\cos2(\theta+t)-120\} - \dfrac{I_5^2}{2}\cos10(\theta+t)-120\} - \dfrac{I_{11}^2}{2}\cos22(\theta+u)-120\} - I_1 I_5 [\cos\{6\theta+s+5t\} - \cos\{4\theta-s+5t-120\}] \\ - I_1 I_{11} [\cos\{12\theta+s+11u\} - \cos\{10\theta-s+11u-120\}] - I_5 I_{11}[\cos\{16\theta+5t+11u-120\} - \cos\{6\theta-5t+11u\}] \end{cases}$ $\ldots 21$

FIG.31

W-PHASE VIBRATING FORCE $f_W \propto$ $\frac{1}{2}(F_1^2 + F_3^2 + F_5^2 + F_7^2) \frac{F_1^2}{2}\cos 2(\theta + \alpha - 240) - \frac{F_3^2}{2}\cos 6(\theta + \beta - 240) - \frac{F_5^2}{2}\cos 10(\theta + \gamma - 240) - \frac{F_7^2}{2}\cos 14(\theta + \delta - 240)$ $-F_1 F_3 [\cos\{4\theta + \alpha + 3\beta - 240\} - \cos\{2\theta - \alpha + 3\beta - 120\}] - F_1 F_5 [\cos\{6\theta + \alpha + 5\gamma\} - \cos\{4\theta - \alpha + 5\gamma - 240\}]$ $-F_1 F_7 [\cos\{8\theta + \alpha + 7\delta - 120\} - \cos\{6\theta - \alpha + 7\delta\}] - F_3 F_5 [\cos\{8\theta + 3\beta + 5\gamma - 120\} - \cos\{2\theta - 3\beta + 5\gamma - 120\}]$ $-F_3 F_7 [\cos\{10\theta + 3\beta + 7\delta - 240\} - \cos\{4\theta - 3\beta + 7\delta - 240\}] - F_5 F_7 [\cos\{12\theta + 5\gamma + 7\delta\} - \cos\{2\theta - 5\gamma + 7\delta - 120\}]$ $\left. \begin{array}{l}
-\dfrac{F_1 I_5}{2}[\cos\{6\theta + \alpha + s - 480\} - \cos(\alpha - s)\} - \dfrac{F_1 I_5}{2}[\cos\{6\theta + \alpha + s t\} - \cos\{4\theta - \alpha + s t\}] \\
-\dfrac{F_1 I_{11}}{2}[\cos\{12\theta + \alpha + 1u\} - \cos\{10\theta - \alpha + 1u + 120\}] \\
-\dfrac{F_3 I_5}{2}[\cos\{8\theta + 3\beta + s - 120\} - \cos\{2\theta - 3\beta + s - 240\}] - \dfrac{F_3 I_{11}}{2}[\cos\{14\theta + 3\beta + 1u - 120\} - \cos\{8\theta - 3\beta + 1u + 240\}] \\
-\dfrac{F_5 I_5}{2}[\cos\{4\theta + 5\gamma + s - 240\} - \cos\{5\gamma - s t\}] - \dfrac{F_5 I_{11}}{2}[\cos\{8\theta + 7\delta + s - 120\} - \cos\{4\theta - 7\delta + 1u + 120\}] \\
-\dfrac{F_7 I_{11}}{2}[\cos\{18\theta + 7\delta + 1u\} - \cos\{4\theta - 7\delta + 1u + 120\}] \\
\end{array} \right\} + 2N$ $+ N^2 \left\{ \dfrac{1}{2}(I_1^2 + I_5^2 + I_{11}^2) - \dfrac{I_1^2}{2}\cos 2(\theta + s - 240) - \dfrac{I_5^2}{2}\cos 10(\theta + t) - \dfrac{I_{11}^2}{2}\cos 22(\theta + u) - 240 - I_1 I_5 [\cos\{6\theta + s + s t\} - \cos\{4\theta - s + s t + 120\}] \right.$ $\left. - I_1 I_{11} [\cos\{2\theta + s + 1u\} - \cos\{10\theta - s + 1u - 240\}] - I_5 I_{11} [\cos\{6\theta + s t + 1u\} - \cos\{6\theta - s t + 1u\}] \right\}$

$$fu + fv + fw \propto$$

$$\frac{3}{2}(F_1^2 + F_3^2 + F_5^2 + F_7^2) + \frac{3}{2}N^2(I_1^2 + I_5^2 + I_{11}^2) + 3NF_1I_1\cos(\alpha-s) + 3NF_5I_5\cos(5\gamma-5t)$$

(1)

$$-\frac{3F_3^2}{2}\cos 6(\theta+\beta) - 3F_1F_5\cos(6\theta+\alpha+5\gamma) + 3F_1F_7\cos(6\theta-\alpha+7\delta) - 3F_5F_7\cos(12\theta+5\gamma+7\delta)$$

(2)　　　　　　　(3)　　　　　　　　　　(4)　　　　　　　　　　　(5)

$$+N\left\{-3F_1I_5\cos(6\theta+\alpha+5t) - 3F_1I_{11}\cos(12\theta+\alpha+11u) - 3F_5I_1\cos(6\theta+5\gamma+s)\right.$$

(6)　　　　　　　　(7)　　　　　　　　(8)

$$+3F_5I_{11}\cos(6\theta-5\gamma+11u) + 3F_7I_1\cos(6\theta+7\delta-s) - 3F_7I_5\cos(12\theta+7\delta+5t) - 3F_7I_{11}\cos(18\theta+7\delta+11u)\right\}$$

(9)　　　　　　　　　(10)　　　　　　　　　(11)　　　　　　　　　　(15)

$$+N^2\left\{-3I_1I_5\cos(6\theta+s+5t) - 3I_1I_{11}\cos(12\theta+s+11u) + 3I_5I_{11}\cos(6\theta-7t+11u)\right\}\cdots 23$$

$$\frac{3F_3^2}{2}\cos 6(\theta+\beta)-3F_1F_5\cos(6\theta+\alpha+5\gamma)+3F_1F_7\cos(6\theta-\alpha+7\delta)-3NF_5I_1\cos(6\theta+5\gamma+s)+3NF_7I_1\cos(6\theta+7\delta-s)$$

⋯⋯⋯⋯⋯⋯⋯⋯⋯⋯⋯⋯⋯⋯⋯ SUM OF VECTORS OF MAGNETIC SOUND TERMS ⋯⋯⋯⋯⋯⋯⋯⋯⋯⋯⋯⋯⋯⋯⋯

$$+N\{-3F_1I_5\cos(6\theta+\alpha+5t)+3F_5I_{11}\cos(6\theta-5\gamma+11u)\}+N^2\{-3I_1I_5\cos(6\theta+s+5t)+3I_5I_{11}\cos(6\theta-7t+11u)\}=0$$

——————————————— CANCELLATION TERMS ———————————————

$$-3F_5 F_7 \cos(12\theta + 5\gamma + 7\delta)$$
······· SUM OF VECTORS OF MAGNETIC SOUND TERMS $$+ N\langle -3F_1 I_{11} \cos(12\theta + \alpha + 11u) - 3F_7 I_5 \cos(12\theta + 7\delta + 5t)\rangle + N^2 \langle -3I_1 I_{11} \cos(12\theta + s + 11u)\rangle = 0$$
──────── CANCELLATION TERMS

···25

METHOD OF CONTROL OF MAGNETIC SOUND OF ALTERNATING CURRENT ROTATING MACHINE

BACKGROUND OF THE INVENTION

1. Field of the Invention

The present invention relates to a method for controlling a magnetic sound of an alternating current rotating machine.

2. Description of the Related Art

In recent years, electric cars, hybrid cars, fuel cell cars, etc. have reached the practical level or developmental level. In these cars, large output alternating current rotating machines are becoming the main units for generating the drive power, but such large output alternating current rotating machines suffer from the problem that they produce loud magnetic sound. As a method for reducing this magnetic sound, Japanese Unexamined Patent Publication (Kokai) No. 11-341864 proposes to generate current waveforms for canceling out the magnetic vibrating force based on information of fluctuation of the force so as to reduce the magnetic sound.

The principle of the technology for reducing magnetic sound by superposition of current of Japanese Unexamined Patent Publication No. 11-341864 described above can be easily understood, but it is not clear which waveforms of current to actually superimpose to reduce the magnetic sound of the intrinsic frequency dominant in an alternating current rotating machine. There is the possibility that the magnetic sound would rather be increased by the superimposition of current or that almost no effect of reduction of the magnetic sound could be obtained.

Namely, a person skilled in the art could easily have conceived of changing the current in some way so as to change the magnetic sound relating to the electro-magnetic force created by that current, but would not have considered the current waveforms to be given for reducing the magnetic sound, particularly the frequencies thereof, so it would have been difficult to actually reduce the magnetic sound with a good precision. This problem becomes still further difficult in the reduction of for example the magnetic sound of an alternating current rotating machine for generating a driving torque in which the driving state changes without interruption.

SUMMARY OF THE INVENTION

An object of the present invention is to provide a method of control of magnetic sound of an alternating current rotating machine effectively realizing for example the reduction of the magnetic sound and an alternating current rotating machine device which can freely control the magnetic sound.

To achieve the above object, according to a first aspect of the present invention, there is provided a method of control of magnetic sound of an alternating current rotating machine comprising, when designating an order of a basic frequency component of a multi-phase alternating current supplied to an armature of a multi-phase alternating current rotating machine as "1", adding, to the multi-phase alternating current, an (n−1)-th order (n is a natural number) radial direction vibration control use harmonic current having an inverse phase sequence from the basic frequency component so as to change, among radial direction vibration comprised of vibration radially generated about an axis of a shaft of the alternating current rotating machine due to vibrating force generated by the alternating current rotating machine or input to the alternating current rotating machine from the outside, n-th order harmonic radial direction vibration components in comparison with a case of not adding the radial direction vibration control use harmonic currents. By this, it first became possible to effectively control the magnetic sound of alternating current rotating machines having various sizes and any output state.

Note that "the inverse phase sequence" means a sequence of supply of phase currents where the directions of rotating magnetic fields formed by the radial direction vibration control use harmonic currents are opposite.

Open control may be performed using values previously determined as the phases or amplitudes of the radial direction vibration control use harmonic currents or feedback control may be performed for making the differences between the detected values of the detected radial direction vibration control use harmonic currents and the target values of the radial direction vibration control use harmonic currents converge to 0. Note that the previously determined values can be changed in accordance with the driving state based on previously stored maps of the basic wave current amplitude or rotation speed and the phase or amplitude.

Namely, according to the present invention, by superimposing an (n1—1)-th order (n is a natural number) radial direction vibration control use harmonic current having the inverse phase sequence as that of the basic frequency component on a stator current of the alternating current rotating machine performing a motor operation or current generation operation, the n-th order magnetic sound can be increased or reduced. Due to this, an extremely silent alternating current rotating machine can be realized and an alternating current rotating machine having the desired magnetic sound can be realized. For example, in a hybrid car, when the engine is stopped and the car is driven by the alternating current rotating machine, a rotation sound for achieving the same feeling of acceleration as that by an engine can be generated. Further, when an abnormality occurs in the car or alternating current rotating machine and the driving condition changes, the magnetic sound can be changed in accordance with this to give the information to a driver. Further, it also becomes possible for the driver to previously set the level or frequency of the magnetic sound to matching with his or her preferences.

This will be explained in further detail below. Magnetic sound is caused by the vibration (also referred to as "magnetic vibration") formed by the magnetic force ("magnetic vibrating force") of a core of an alternating current rotating machine. This magnetic vibration becomes the combined vibration of a circumferential direction vibration and a radial direction vibration. The circumferential direction vibration of the core causes a torque ripple, but since the stator core or rotor core has a substantially cylindrical shape or columnar shape, even when these cores periodically vibrate in the circumferential direction, the vibration of the air next to the cores due to this vibration, that is, the noise, is small. Contrary to this, the vibration in the radial direction of the core causes the radial direction vibration of an outer circumference or an inner circumference of the stator core or rotor core, but the outer circumference or inner circumference is next to the air, therefore the radial direction vibration of the stator core or rotor core causes the outer circumference or inner circumference to vibrate in the radial direction and cause a large noise. That is, a torque ripple is reduced by reducing the circumferential direction component of the magnetic vibrating force, and the magnetic sound is reduced by reducing the radial direction component of the magnetic vibrating force.

In the present invention, in order to change or reduce harmonic components of predetermined orders of the radial direction components of the magnetic vibrating force (also referred to as the "radial direction magnetic vibrating force") usually formed by the rotor magnetomotive force and stator current (basic frequency component) to target values, number of predetermined orders−1 radial direction vibration control use harmonic current having an order that is smaller by one than the predetermined order and an inverse phase sequence from the basic frequency component are added to the stator current (multi-phase alternating current) so as to add magnetic vibrating forces of predetermined orders having phases and amplitudes giving the target amplitude of the sum of vectors with the harmonic components (preferably small). Due to this, the magnetic sound can be controlled (increased or reduced).

Namely, according to the present invention, when designating an order of a basic frequency as "1", an (n−1)-th order radial direction vibration control use harmonic current having a inverse phase sequence is added to an armature of an alternating current rotating machine having a basic frequency current. Due to this, n-th order harmonic component of a radial direction vibration can be controlled. The reason for this will be explained later. Note that, as the phases and amplitudes of the radial direction vibration control use harmonic currents, suitable values found in advance by experiments, values computed based on equations explained later and values computed by numerical calculation such as finite element method (FEM) should be used.

Preferably, the method further comprises adding radial direction vibration control use harmonic currents having predetermined amplitudes and phases to the basic frequency component of the multi-phase alternating current so as to control (reduce and increase) said harmonic radial direction vibration components more than a case of not adding the radial direction vibration control use harmonic currents. Due to this, magnetic sound can be controlled (reduced and increased) well and reliably.

Preferably, the alternating current rotating machine is a three-phase alternating current rotating machine; the order of the radial direction vibration control use harmonic current is a (6k−1)-th order (k is a natural number). Due to this, for example both of the 6k-th order harmonic radial direction vibration component dominant in a three-phase alternating current rotating machine can be reduced well.

Preferably, the order of the radial direction vibration control use harmonic current having is at least one of a fifth, 11th, 17th and 23th order. Due to this, at least one of the sixth, 12th, 18th and 24th order harmonic radial direction vibration component dominant in a three-phase alternating current rotating machine can be reduced well.

Preferably, the method further comprises computing amplitudes and phases of the radial direction vibration control use harmonic currents to be added to the multi-phase alternating current in order to obtain target values of the harmonic radial direction vibration components based on predetermined maps or equations showing relationships between the harmonic radial direction vibration components and the radial direction vibration control use harmonic currents and adding the computed values of the radial direction vibration control use harmonic currents to the multi-phase alternating current.

Namely, in this aspect of the invention, by utilizing predetermined relationships (maps or equations) between harmonic radial direction vibration components and radial direction vibration control use harmonic currents previously stored in the system, the radial direction vibration control use harmonic currents for generating the intended harmonic radial direction vibration components, that is, the target values of the harmonic radial direction vibration components, are computed and the computed radial direction vibration control use harmonic currents are supplied to thereby generate the target values of the harmonic radial direction vibration components. By doing this, the target values of the harmonic radial direction vibration components, that is, the required harmonic radial direction vibration components, can be freely generated irrespective of a change of the driving situation.

Preferably, the method further comprises detecting the harmonic current components supplied to the armature and performing feedback control so that deviations of amplitude and phases between detected values of the harmonic current components and computed values of the radial direction vibration control use harmonic currents to be added to the multi-phase alternating current become 0 so as to obtain target values of the harmonic radial direction vibration components. Due to this, the desired harmonic radial direction vibration components can be reliably generated.

Preferably, the method further comprises detecting the harmonic radial direction vibration components or electrical parameters associated with the same, computing the amplitudes and phases of the radial direction vibration control use harmonic currents corresponding to the differences of the radial direction vibration components or electrical parameters associated with the same corresponding to the deviations between the detected values of the harmonic radial direction vibration components or the electrical parameters associated with the same and the target values of the harmonic radial direction vibration components or the electrical parameters associated with the same based on maps or equations, and adding the computed values of the radial direction vibration control use harmonic currents to the multi-phase alternating current. Due to this, the desired harmonic radial direction vibration components can be reliably generated.

(Modifications)

1. The order of the inverse phase sequences of the radial direction vibration control use harmonic currents (that is, the multiples of the frequencies of the radial direction vibration control use harmonic currents with respect to the frequency of the basic frequency component) naturally can include tolerances in production of harmonic current generation circuits. For example, n−1 can be between (n−1)−0.1 and (n−1)+0.1.

2. As the alternating current rotating machines, preferably various types of synchronous machines are employed. As the operation mode, either of the motor mode or power generation mode can be utilized. Further, the radial direction vibration control use harmonic currents can be superimposed at all rotation areas or the radial direction vibration control use harmonic currents can be superimposed at only the rotation areas where magnetic sound particularly becomes a problem.

3. A predetermined single order of radial direction vibration can be reduced by superimposing a radial direction vibration control use harmonic current of a predetermined single order or radial direction vibrations of a plurality of orders can be reduced by superimposing radial direction vibration control use harmonic currents of a plurality of orders.

4. The change, particularly reduction, of the magnetic sound described above can be selectively executed in only a specific period requiring silence in the vehicle use alternating current rotating machine such as when stopping the vehicle use engine, when decelerating when the engine noise is small, or during regenerative braking.

BRIEF DESCRIPTION OF THE DRAWINGS

These and other objects and features of the present invention will become clearer from the following description of the preferred embodiments given with reference to the attached drawings, wherein:

FIG. 10 shows Equation 1 for defining a magnetic flux;

FIG. 11 shows Equation 2 for defining a magnetic energy;

FIG. 12 shows Equation 3 for defining a magnetic vibrating force;

FIG. 13 shows Equation 4 for defining a rotor magnetomotive force and a stator current of U-phase;

FIG. 14 shows Equation 5 for defining a rotor magnetomotive force and a stator current of V-phase;

FIG. 15 shows Equation 6 for defining a rotor magnetomotive force and a stator current of W-phase;

FIG. 16 shows Equation 7 for defining a U-phase vibrating force;

FIG. 17 shows Equation 8 for defining a V-phase vibrating force;

FIG. 18 shows Equation 9 for defining a W-phase vibrating force;

FIG. 19 shows Equation 10 for defining combination of three phase vibrating forces;

FIG. 20 shows Equation 11 for defining a rotor magnetomotive force and a stator current having two harmonic components of U-phase;

FIG. 21 shows Equation 12 for defining a rotor magnetomotive force and a stator current having two harmonic components of V-phase;

FIG. 22 shows Equation 13 for defining a rotor magnetomotive force and a stator current having two harmonic components of W-phase;

FIG. 23 shows Equation 14 for defining a U-phase vibrating force calculated by Equation 11;

FIG. 24 shows Equation 15 for defining a V-phase vibrating force calculated by Equation 12;

FIG. 25 shows Equation 16 for defining a W-phase vibrating force calculated by Equation 13;

FIG. 26 shows Equation 17 obtained by making j=3, k=5, l=7, m=5, and n=11 in Equation 11;

FIG. 27 shows Equation 18 obtained by making j=3, k=5, l=7, m=5, and n=11 in Equation 12;

FIG. 28 shows Equation 19 obtained by making j=3, k=5, l=7, m=5, and n=11 in Equation 13;

FIG. 29 shows Equation 20 for defining a U-phase vibrating force calculated by Equation 17;

FIG. 30 shows Equation 21 for defining a V-phase vibrating force calculated by Equation 18;

FIG. 31 shows Equation 22 for defining a W-phase vibrating force calculated by Equation 19;

FIG. 32 shows Equation 23 obtained by combining three phase vibrating forces defined by Equations 17 to 18;

FIG. 33 shows Equation 24 for cancellation of sixth order vibrating force component; and FIG. 34 shows Equation 25 for cancellation of 12th order vibrating force component.

DESCRIPTION OF THE PREFERRED EMBODIMENTS

Below, preferred embodiments of the present invention will be explained with reference to the drawings.

(Explanation of Principle)

Below, the principle when applying the present invention to a three-phase alternating current rotating machine will be explained below.

Figure 1:
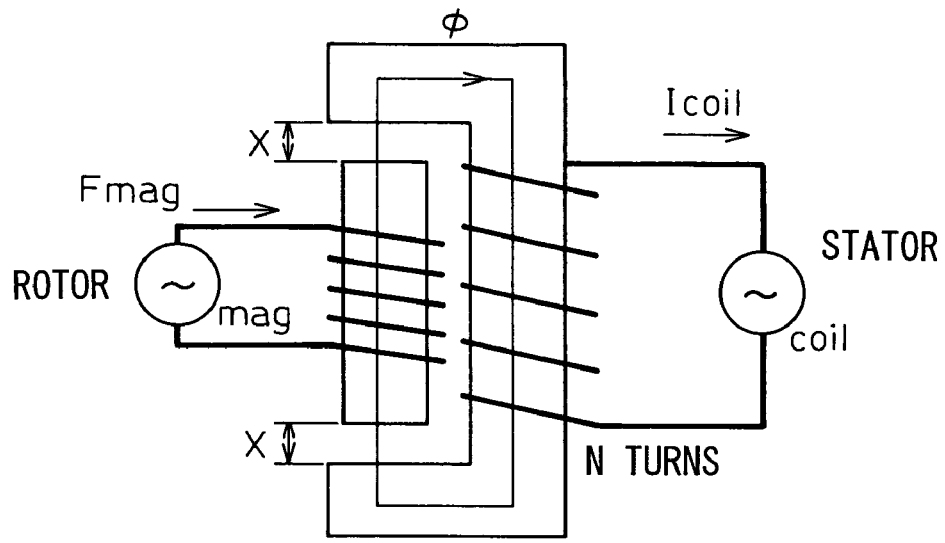
FIG. 1 is a view schematically illustrating one phase's worth of a magnetic circuit of a three-phase alternating current rotating machine.
Figure 2:
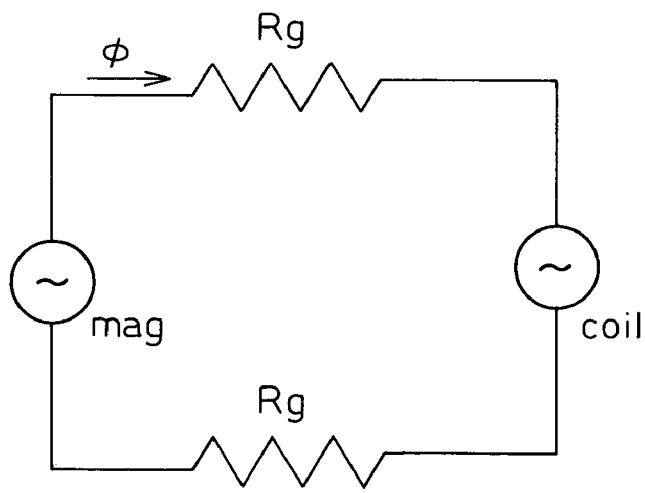
FIG. 2 is an equivalent magnetic circuit diagram of FIG. 1.

FIG. 1 is a schematic view of one-phase's worth of a magnetic circuit of a three-phase alternating current rotating machine, while FIG. 2 is an equivalent magnetic circuit diagram of FIG. 1. In a synchronous machine, a magnetic flux $\phi$ is formed by a magnetic pole of the rotor (formed by a coil or permanent magnet), a rotor magnetomotive force Fmag is the magnetomotive force of the magnetic pole of the rotor in the magnetic circuit, that is, a magnetic field intensity, and a stator magnetomotive force Fcoil is the magnetomotive force formed in the magnetic circuit by the stator current, that is, a magnetic field intensity. Rg is a magnetic resistance of a gap between the stator and the rotor. Note that, in the above figures and the following equations, Icoil is a stator current (phase current of the armature), x is a gap width, S is an area facing the gap portion, $\mu 0$ is the permeability of air, and N is a number of turns of each phase coil of the armature.

The magnetic flux is defined by equation 1, the magnetic energy is defined by equation 2, the magnetic vibrating force is defined by equation 3, the U-phase rotor magnetomotive force and the stator current are defined by equation 4, the V-phase rotor magnetomotive force and the stator current are defined by equation 5, and the rotor magnetomotive force and the stator current of W-phase are defined by equation 6. Equations 1 to 6 are respectively shown in FIGS. 10 to 15.

Here, the rotor schematically shown in FIG. 1 rotates in an actual rotating electric machine, therefore the rotor magnetomotive force is expressed as a function of a sine wave. Namely, the magnetic vibrating force f is defined as the sum of a square of the rotor magnetomotive force, the square of the stator magnetomotive force, and the product of the rotor magnetomotive force and the stator magnetomotive force. Here, as an example, the rotor magnetomotive force includes third, fifth, and seventh order harmonic components produced due to the influence of the rotor shape etc. in the basic frequency component (first order component). Here, it is assumed that the stator current is comprised by only the basic frequency component. Naturally, both of the rotor magnetomotive force and the stator current can include harmonic components other than this as well.

If calculating the magnetic vibrating forces (also simply referred to as the "vibrating forces") of the different phases from Equation 4 to Equation 6 and Equation 3, Equation 7 to Equation 9 are obtained.

Equations 7 to 9 are respectively shown in FIGS. 16 to 18. Note that, $F_i$ is the amplitude of an i-th order component of the rotor magnetomotive force, $I_i$ is the amplitude of the i-th order component of the stator current, $\theta$ is the rotation angle of the rotor, $\alpha$, $\beta$, $\gamma$, $\delta$, s, t, and u are phase angles. In Equation 7 to Equation 9, the terms indicated by the solid underlines are terms the same in phase in each phase, while the terms indicated by the broken underlines are terms shifted in phase by 120 degrees for each phase. A magnetic sound is formed by the vibrating force obtained by combining the vibrating forces of these phases, therefore, when Equation 7 to Equation 9 are added, Equation 10 is obtained.

Equations 10 is shown in FIG. 19. The following are explanations of the terms of Equation 10.
(1) term: DC component
(2) term: Sixth order component generated by third order harmonic of rotor magnetomotive force
(3) term: Sixth order component generated by first order and fifth order harmonics of rotor magnetomotive force
(4) term: Sixth order component generated by first order and seventh order harmonics of rotor magnetomotive force
(5) term: 12th order component generated by fifth order and seventh order harmonic components of rotor magnetomotive force
(6) term: Sixth order component generated by fifth order of rotor magnetomotive force and first order of stator current
(7) term: Sixth order component generated by seventh order of rotor magnetomotive force and first order of stator current In Equation 10, the terms indicated by the solid underlines in Equation 7 to Equation 9 are same in phase, so they strengthen each other, while the terms indicated by the broken underlines in Equation 7 to Equation 9 are cancelled out since the sum of the three phase vectors becomes 0. That is, the sixth order components indicated by (2), (3), (4), (6), and (7) in Equation 10 and the 12th component indicated by (5) are terms strengthening each other, so become the cause of magnetic sound of the three-phase alternating current rotating machine. When entering a further fine condition for calculation, it is learned that the combined vibrating force of the three-phase alternating current rotating machine becomes a whole multiple of 6, and the harmonic components of the magnetic sound include a 6k (k is a natural number)-th order component.

Next, a case where two harmonic current components, which are m-th and n-th harmonic current components, having inverse phase sequences as that of the basic frequency components, are superimposed on this basic frequency component (the first order component) of the stator current will be explained. For generalization, assume the rotor magnetomotive force includes the first order, the j-th order, the k-th order, and the l-th order. The rotor magnetomotive force and stator current of each phase in this case are indicated by Equation 11 to Equation 13, therefore, when these Equation 11 to Equation 13 are calculated in the same way as the above description, Equation 14 to Equation 16 are obtained.

Equations 11 to 16 are respectively shown in FIGS. 20 to 25. Note that, $F_i$ is the amplitude of an i-th order component of the rotor magnetomotive force, $I_i$ is the amplitude of the i-th order component of the stator current, $\theta$ is the rotation angle of the rotor, $\alpha$, $\beta$, $\gamma$, $\delta$, s, t, and u are phase angles. j, K, L, m, n are integers.

In Equation 14 to Equation 16, terms indicated by solid underlines are terms the same in phase in each phase, the terms indicated by broken underlines are terms shifted in phase by 120 degrees for each phase. Magnetic sound is formed by the vibrating force obtained by combining the vibrating forces of the different phases. The terms indicated by the solid underlines in Equation 14 to Equation 16 are same in phase, so they strengthen each other, while the terms indicated by the broken underlines in Equation 14 to Equation 16 are cancelled out since the sum of the three phase vectors becomes 0. Namely, it is learned that the (m+1)-th order, (n+1)-th order, and (m−n)-th order vibrating forces can be generated when the m-th and n-th order harmonic current components in the inverse phase sequence are added.

That is, the (m+1)-th order, the (n+1)-th order, and the (m−n)-th order vibrating forces can be freely generated by the m-th order and n-th order harmonic current components. Due to this, magnetic sound can be increased or reduced.

Next, a case where the fifth order and seventh order harmonic current components are superimposed in the inverse phase sequence in order to reduce the sixth order and 12th order magnetic sounds which become problems in a three-phase alternating current rotating machine will be analyzed by utilizing the above results of analysis.

By making j=3, k=5, l=7, m=5, and n=11 in Equation 11 to Equation 13, when considering the first order, third order, fifth order, and seventh order rotor magnetomotive forces and the first order, fifth order and 11th order stator currents, the rotor magnetomotive forces and stator currents of the phases are indicated by Equation 17, Equation 18, and Equation 19 that are respectively shown in FIGS. 26 to 28.

It is seen from these equations that, by processing in the same way as the above, the vibrating forces of the different phases are indicated by Equation 20 to Equation 22 and the vibrating force obtained by combining the vibrating forces of the different phases is indicated by Equation 23.

Equations 20 to 23 are respectively shown in FIGS. 29 to 32. Note that, the terms indicated by the solid underlines in Equation 20 to Equation 22 are same in phase, so they strengthen each other, while the terms indicated by the broken underlines in Equation 20 to Equation 22 are cancelled out since the sum of the three phase vectors becomes 0.

The following are explanations of terms of Equation 23 in FIG. 32.
(1) term: DC component
(2) term: Sixth order component generated by third order of rotor magnetomotive force
(3) term: Sixth order component generated by first order and fifth order of rotor magnetomotive force
(4) term: Sixth order component generated by first order and seventh order of rotor magnetomotive force
(5) term: 12th order component generated by fifth order and seventh order of rotor magnetomotive force
(6) term: Sixth order component generated by fifth order of rotor magnetomotive force and first order of stator current
(7) term: Sixth order component generated by seventh order of rotor magnetomotive force and first order of stator current Following terms are due to superposition of fifth and 11th order components of stator current
(8) term: Sixth order component generated by first order of rotor magnetomotive force and fifth order of stator current (9) term: 12th order component generated by first order of rotor magnetomotive force and 11th order of stator current

(10) term: Sixth order component generated by fifth order of rotor magnetomotive force and 11th order of stator current

(11) term: 12th order component generated by seventh order of rotor magnetomotive force and fifth order of stator current

(12) term: Sixth order component generated by first order and fifth order of stator current

(13) term: 12th order component generated by first order and 11th order of stator current

(14) term: Sixth order component generated by fifth order and 11th order of stator current

(15) term: 18th order component generated by seventh order of rotor magnetomotive force and 11th order of stator current Accordingly, when comparing Equation 10 of the combined vibrating force in the case where no harmonic current component is superimposed, and Equation 23 of the combined vibrating force in the case where a harmonic current component is superimposed, it is seen that the sixth order and 12th order vibrating forces are newly produced due to the superimposition of the fifth order and 11th order harmonic current components in the inverse phase sequence separately from the sixth order and 12th order vibrating forces produced in Equation 10.

That is, it is seen that the magnitudes of the sixth order and 12th order magnetic sounds (radial direction vibrations) which become a problem in a three-phase alternating current rotating machine can be controlled by adjusting the amplitudes and phases of the fifth order and 11th order harmonic current components in the inverse phase sequence. For example, in Equation 23, the amplitudes and phases of the fifth order and 11th order harmonic current components in the inverse phase sequence able to minimize the amplitude of the sixth order vibrating force and the amplitude of the 12th order vibrating force may be determined. Alternatively, either vibrating force may be given priority, and the other vibrating force may be minimized within a permissible range.

The conditions of the phase fifth order and 11th order harmonic current components in the case where the sixth order vibrating force is 0 are shown in Equation 24 shown in FIG. 33.

Namely if sum of vectors of magnetic sound terms ((2)+(3)+(4)+(6)+(7))+sum of vectors of cancellation terms ((8)+(9)+(12)+(13))=0, six order component is cancelled.

The amplitudes and phases of the harmonic current components should be determined so as to make the sum of the magnetic sound term and the cancellation term 0 in Equation 24.

The conditions of the fifth order and eleventh order harmonic current components in the case where the 12th order vibrating force is made 0 is shown in Equation 25 shown in FIG. 34. namely, if vector sum (5) of magnetic sound term+vector sum ((10)+(11)+(14)) of cancellation term=0, 12th order component is cancelled.

The amplitudes and phases of the harmonic current components should be determined so as to make the sum of the magnetic sound term and the cancellation term 0 in Equation 25.

(Modification 1)

The above processing of equations was carried out taking as an example a three-phase alternating current rotating machine, but the same processing results can also be obtained by the same method in another phase number alternating current rotating machine. In the above processing of equations, the case where the rotor magnetomotive force included first, third, fifth, and seventh orders and the fifth order and 11th order harmonic current components were superimposed on the basic frequency component (first order) of the stator current was explained, but naturally the present invention is not limited to this. The ninth and 11th orders can be added to the rotor magnetomotive force as well, and the rotor magnetomotive force can be comprised by first, third, and fifth orders and can be comprised by first, third, and seventh orders as well. More than two harmonic currents can be superimposed to the stator current Further, the sixth and 12th orders of the magnetic sound were reduced or changed, but similarly the 18th, 24th, and other orders can be changed.

The important point in the present invention resides is that a vibrating force of an order equal to the order of (1−x)-th order harmonic current component can be generated when an x-th order harmonic current component is superimposed on the basic frequency component (first order) of the stator current in the inverse phase sequence. Namely, by superimposing an x-th order harmonic current component in the inverse sequence, a vibrating force of (1−(−x))=1+x can be generated. Note that when using the phase sequence of the basic frequency component as a standard, the x-th order harmonic current component in the inverse phase sequence becomes an −x-th order harmonic current component. That is, a vibrating force has an order equal to the difference of orders of a plurality of frequency currents, therefore when an x-th order harmonic current component is added to the basic frequency component of the stator current in the inverse phase sequence, a vibrating force of an order of x+1 of the difference of the two orders is generated. The discovery that the n−1-th order harmonic current may be superimposed in preferred phases and with preferred amplitudes in the inverse phase sequence in order to increase or reduce the n-th order magnetic sound of an alternating current rotating machine has never been known in the past and will be very important in the development of a low noise motor from now on. Further, the fact that the (m−1)-th order, (n−1)-th order, and (m−n)-th order magnetic vibrating force components can be simultaneously changed (increased or reduced) as well by superimposing the m-th and n-th order harmonic current components on the basic frequency component in the inverse phase sequence is not conventionally known. By utilizing this, it becomes possible to adjust a plurality of vibrating forces by the adjustment of the amplitudes and phases of the m-th and n-th order harmonic current components to be added.

(Circuit Configuration Example 1)

Figure 3:
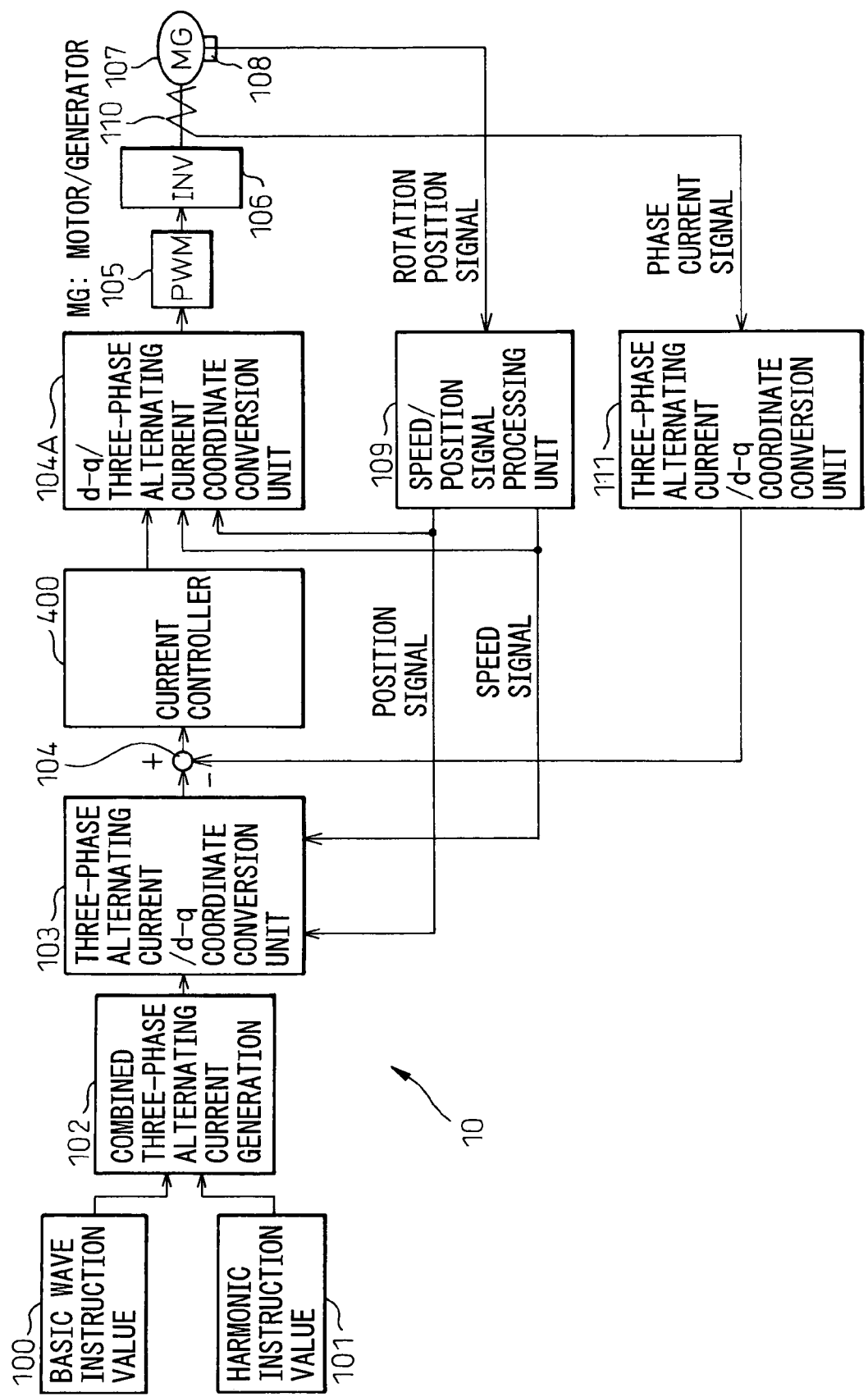
FIG. 3 is a block circuit diagram of a motor control circuit employing a magnetic sound change method according to an embodiment of the present invention.

An example of a circuit for superimposing harmonic currents as described above is shown in FIG. 3. This motor control circuit is an embodiment of feedback control of a motor current.

Reference numeral 10 is a motor current controlling means for controlling the motor current of a three-phase synchronous machine 107 and has the following configuration. Reference numeral 100 is an amplitude/phase instruction circuit block for instructing the amplitude and phase of the current instruction value (three-phase alternating current coordinate system) corresponding to the basic value. Reference numeral 101 is an amplitude/phase instruction circuit block for instructing the amplitude and phase of the harmonic current of a predetermined order (three-phase alternating current coordinate system).

The amplitude/phase instruction circuit block 100 determines the amplitude and phase based on a current instruction (basic wave) received from an external control device, for example, a vehicle control electronic control unit (ECU). Further, the circuit block 100 may be configured by this vehicle control ECU as well. This external control device computes the current instruction value as this basic wave based on the rotation angle signal (rotation position signal) and torque instruction of the three-phase synchronous machine 107.

The circuit block 101 inputs the frequency, amplitude, and phase of the current instruction (basic wave) current to the above equations for processing to thereby determine the frequency, amplitude, and phase of the harmonic current of a predetermined order determined in advance and outputs an amplitude/phase instruction instructing them. The other constants in these equations are previously set in accordance with the object.

For example, when reducing or canceling the sixth order and 12th order magnetic sound, the amplitudes and phases of the fifth order and/or 11th seventh order harmonic currents should be determined so that the values of Equation 24 and Equation 25 become predetermined values or less. The other constants are previously set as numerical values distinctive to the alternating current rotating machine. In any case, by adjusting the phases/amplitudes of inverse phase sequence fifth order and/or 11th order harmonic currents to be superimposed, the sixth order and/or 12th order magnetic sound, that is, the major part of the magnetic sound, can be increased, reduced, or cancelled.

Note that in place of computation of the equations, it is also possible to enter the frequency, phase, and amplitude of the basic frequency component in maps or tables corresponding to these equations in advance to search for the values of phases and amplitudes of the fifth order and/or 11th order harmonic currents. The instructions concerning these basic wave current and harmonic currents are input to the circuit block 102. The circuit block 102 adds the basic wave current value and harmonic current values of phases determined based on the input information for each phase and periodically calculates the combined three-phase alternating current value.

The calculated combined three-phase alternating current values are converted to coordinates in a d-q axis system by a circuit block 103 for the coordinate conversion and compared with these detected values (d-q axis) at a subtractor 104. The difference is adjusted in gain by a current amplifier 400 and output to the three-phase alternating current value at a circuit block 104A for the coordinate conversion.

The circuit block 104A generates PWM control voltages of different phases for eliminating the above difference at a circuit block 105, intermittently controls switching elements of a three-phase inverter 106 by the three-phase PWM control voltages, and supplies output voltages of the three-phase inverter 106 to the stator coil of the power generator, that is, the three-phase synchronous machine 107. The three-phase alternating current flowing through the three-phase synchronous machine 107 is made the sum of the basic wave current and harmonic currents having frequencies, amplitudes, and phases designated by the circuit blocks 100 and 101. This type of PWM feedback control per se is already well known, so a detailed explanation will be omitted.

The three-phase synchronous machine 107 has a built-in rotation angle sensor 108. A speed/position signal processing circuit block 109 extracts a speed signal and a position signal from the rotation position signal output from the rotation angle sensor 108 and inputs them to the circuit block 104A. Further, the stator coil current of the three-phase synchronous machine 107 is detected at a current sensor 110, converted to a d-axis current detected value and a q-axis current detected value at a coordinate conversion circuit block 111, and input to the subtractor 104.

(Circuit Configuration Example 2)

Figure 4:
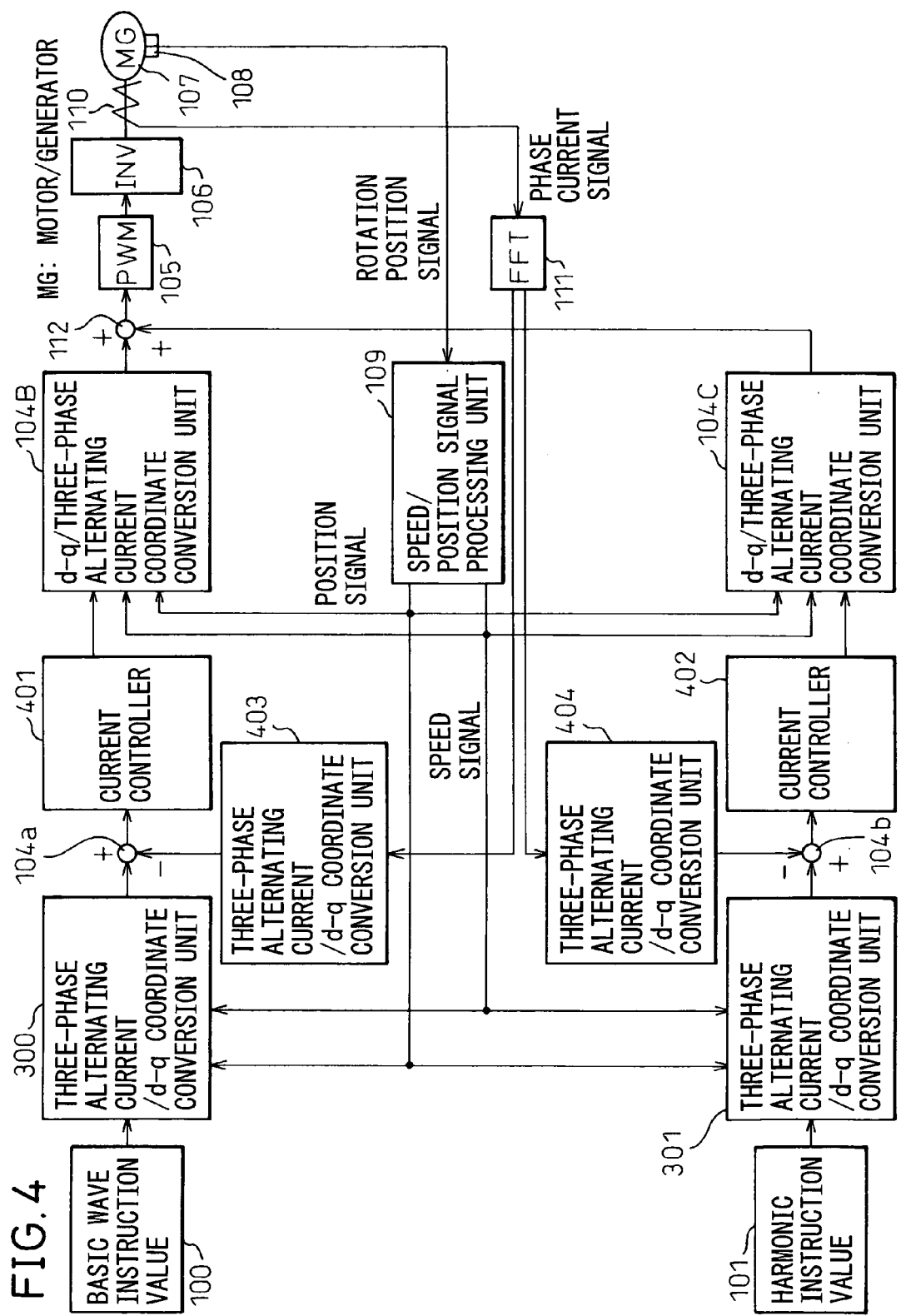
FIG. 4 is a block circuit diagram of a motor control circuit employing a magnetic sound change method according to another embodiment of the present invention.

An example of a circuit for superimposing harmonic currents described above is shown in FIG. 4.

Reference numeral 100 is an amplitude/phase instruction circuit block for instructing the amplitude and phase used as a current instruction value (three-phase alternating current coordinate system) corresponding to the basic wave. The instruction value output from the circuit block 100 is output to the subtractor 104A via a circuit block 300 for converting a three-phase alternating current coordinate system to a d-q axis system in the same way as the Circuit Configuration Example 1. The FFT 111 extracts the detected value of the basic wave component (three-phase alternating current coordinate system) from the phase current output from the current detection. The detected value is converted in coordinates by a circuit block 403 for converting the three-phase alternating current coordinate system to the d-q axis system, then compared with the current instruction value at the subtractor 104a. The difference is output to a circuit block 104B for the coordinate conversion through a current controller 401 for the gain adjustment. The circuit block 104B outputs a three-phase alternating current instruction value for eliminating the difference to an adder 112.

Reference numeral 101 is an amplitude/phase instruction circuit block for instructing an amplitude and phase as a current instruction value (three-phase alternating current coordinate system) corresponding to a harmonic of a predetermined order. The instruction value output from the circuit block 100 is output to the subtractor 104a via a circuit block 300 for converting the three-phase alternating current coordinate system to the d-q axis system in the same way as the Circuit Configuration Example 1. The FFT 111 extracts the detected value of the harmonic component (three-phase alternating current coordinate system) of the predetermined order from the motor current. The detected value is converted in coordinates by a circuit block 404 for converting a three-phase alternating current coordinate system to a d-q axis system, then compared with the current instruction value at the subtractor 104b. The difference is output through a current controller 402 for gain adjustment to a circuit block 104C for the coordinate conversion. The circuit block 104B outputs a three-phase alternating current instruction value for eliminating the difference to the adder 112.

The circuit block 104C outputs the three-phase alternating current instruction value for eliminating the difference to the adder 112. The position signal and speed signal are extracted from the rotation position signal detected by the circuit block 109 and output to the circuit blocks 104B, 104C, 300, and 301 for coordinate conversion.

The PWM control voltages of the different phases corresponding to the combined three-phase alternating current instruction value added at the adder 112 are generated at a circuit block 105, the switching elements of the three-phase inverter 106 are intermittently controlled by this three-phase PWM control voltage, and the output voltage of this three-phase inverter 106 is output to the stator coil of the three-phase synchronous machine 107 as the generator/motor. The three-phase alternating current flowing through the three-phase synchronous machine 107 is made the sum of the basic frequency component and harmonic currents having the frequencies, amplitudes, and phases designated at the circuit blocks 100 and 101.

(Circuit Configuration Example 3)

Figure 5:
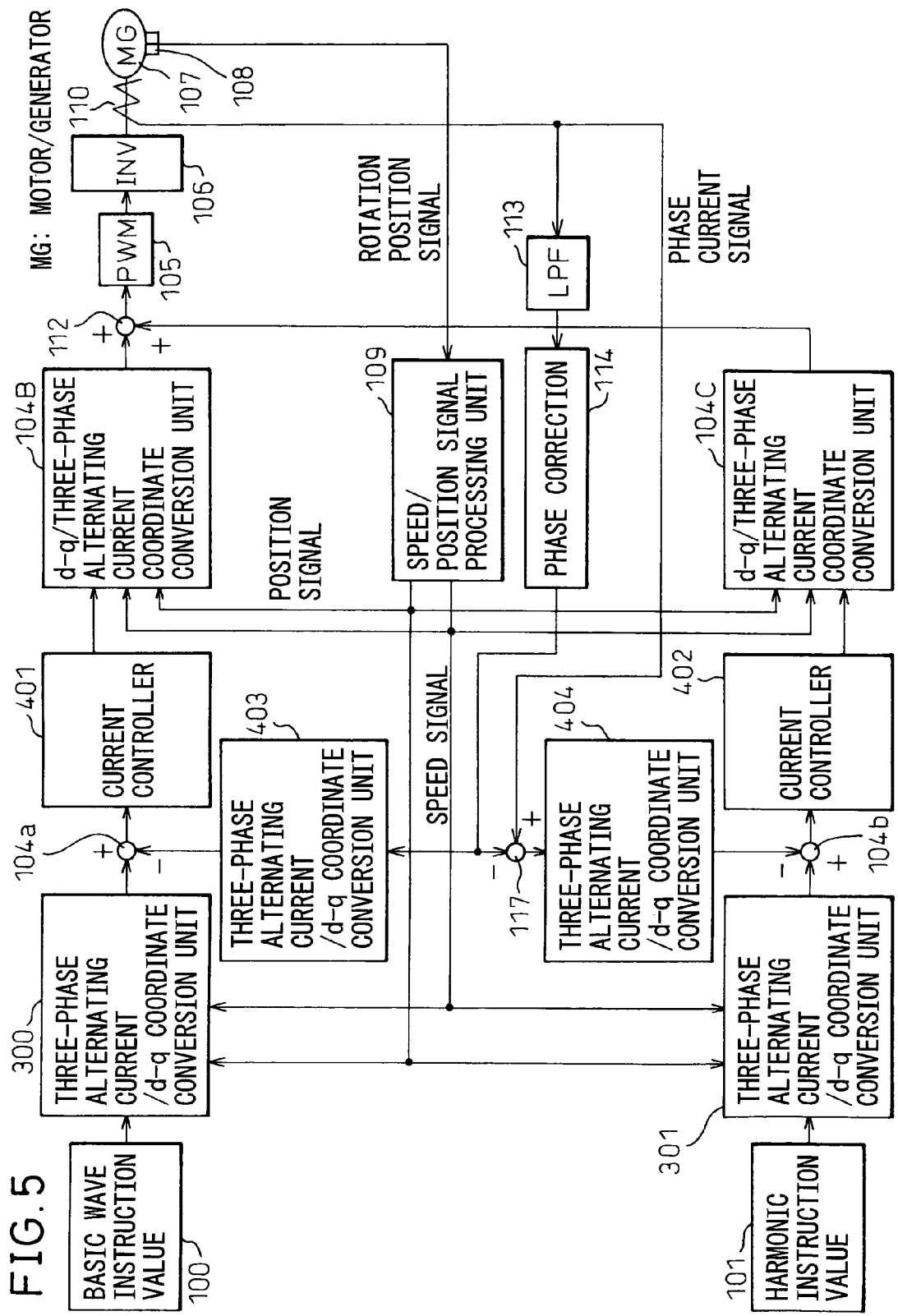
FIG. 5 is a block circuit diagram of a motor control circuit employing a magnetic sound change method according to still another embodiment of the present invention.

An example of a circuit for superimposing harmonic currents described above is shown in FIG. 5. This circuit employs a low pass filter 113 in place of the FFT 111 shown in FIG. 4 and extracts the basic wave current detected value and the harmonic current detected values.

The detected value of the basic wave component (three-phase alternating current coordinate system) is extracted from the phase current signal detected at the current sensor 110. This detected value is converted in coordinates by a circuit block 403 for converting a three-phase alternating current coordinate system to a d-q axis system, then compared with the current instruction value for the basic wave at the subtractor 104a. The difference is output to the circuit block 104B for the coordinate conversion through the gain adjustment use current controller 401. The circuit block 104B outputs a three-phase alternating current instruction value for eliminating the difference to the adder 112.

The subtractor 117 subtracts the basic wave component (three-phase alternating current coordinate system) of the phase current signal from the phase current signal (three-phase alternating current coordinate system) detected at the current sensor 110 and extracts the harmonic components thereof. The detected harmonic components are converted in coordinates by the circuit block 404 for converting a three-phase alternating current coordinate system to a d-q axis system, then compared with the current instruction values for harmonics at the subtractor 104b. The difference is output through the gain adjustment use current controller 402 to the circuit block 104C for the coordinate conversion. The circuit block 104C outputs a three-phase alternating current instruction value for eliminating the difference to the adder 112. By this, the same operation as that in the Circuit Configuration Example 2 can be carried out.

(Circuit Configuration Example 4)

Figure 6:
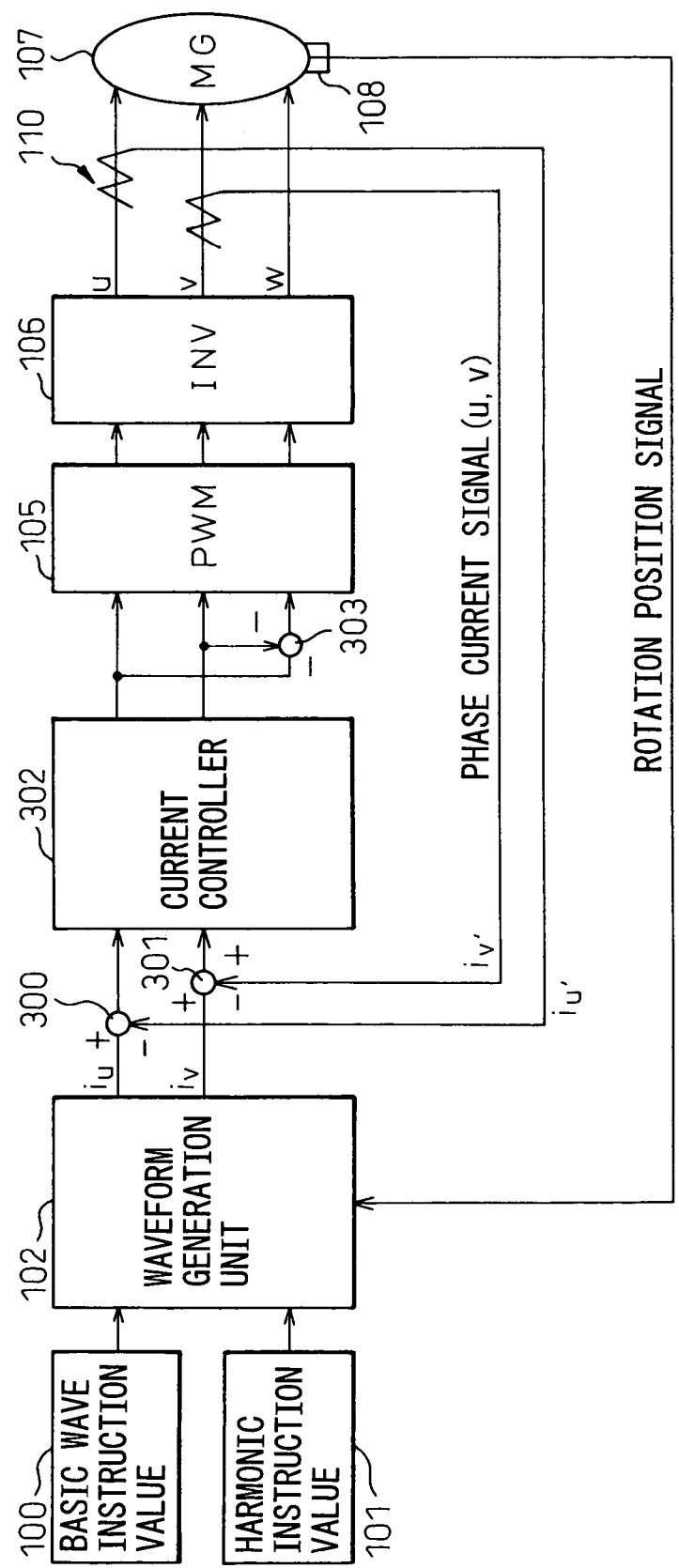
FIG. 6 is a block circuit diagram of a motor control circuit employing a magnetic sound change method according to still another embodiment of the present invention.

An example of a circuit for superimposing harmonic currents described above is shown in FIG. 6. This motor control circuit is an embodiment for feedback control of the motor current in only a three-phase alternating current coordinate system.

Reference numeral 100 is an amplitude/phase instruction circuit block for instructing the amplitude and phase of the current instruction value (three-phase alternating current coordinate system) corresponding to the basic wave. Reference numeral 101 is an amplitude/phase instruction circuit block for instructing the amplitude and phase of a harmonic current (three-phase alternating current coordinate system) having a predetermined order. The functions of these circuit blocks are the same as those in the case of FIG. 3. The harmonic circuit block 101 calculates the frequency, phase, and amplitude output from the circuit block based on the above equations or performs substantially the same processing by using maps or tables.

The amplitude/phase instructions output from the circuit blocks 100 and 101 are input to the circuit block 102. The circuit block 102 adds the basic wave current instruction value (three-phase alternating current coordinate system) and harmonic current instruction value (three-phase alternating current coordinate system) in the U-phase and the V-phase based on the amplitude/phase instruction of the input basic wave current instruction value, the amplitude/phase instruction of the harmonic current instruction value, and the detected rotation position signal and outputs them as a U-phase combined current instruction value (three-phase alternating current coordinate system) iu and V-phase combined current instruction value (three-phase alternating current coordinate system) iv.

The subtractor 300 finds the difference between the detected U-phase current detected value iu' and the U-phase combined current instruction value iu and outputs this difference to the circuit block 302 forming the current controller. The subtractor 301 finds the difference between the detected V-phase current detected value iv' and the V-phase combined current instruction value iv and outputs this difference to the circuit block 302 forming the current controller. The circuit block 302 forms the U-phase voltage and the V-phase voltage eliminating the difference, while the circuit block 105 computes and outputs the PWM voltages of the U-phase and V-phase corresponding to these U-phase voltage and V-phase voltage. Further, the subtraction inversion circuit 303 calculates an analog inversion signal having the difference between the U-phase voltage and the V-phase voltage as a W-phase voltage, while the circuit block 105 computes and outputs the PWM voltage of this W-phase voltage. The three-phase inverter 106 is intermittently controlled in accordance with the duty corresponding to these PWM voltages of three phases.

(Circuit Configuration Example 5)

Figure 7:
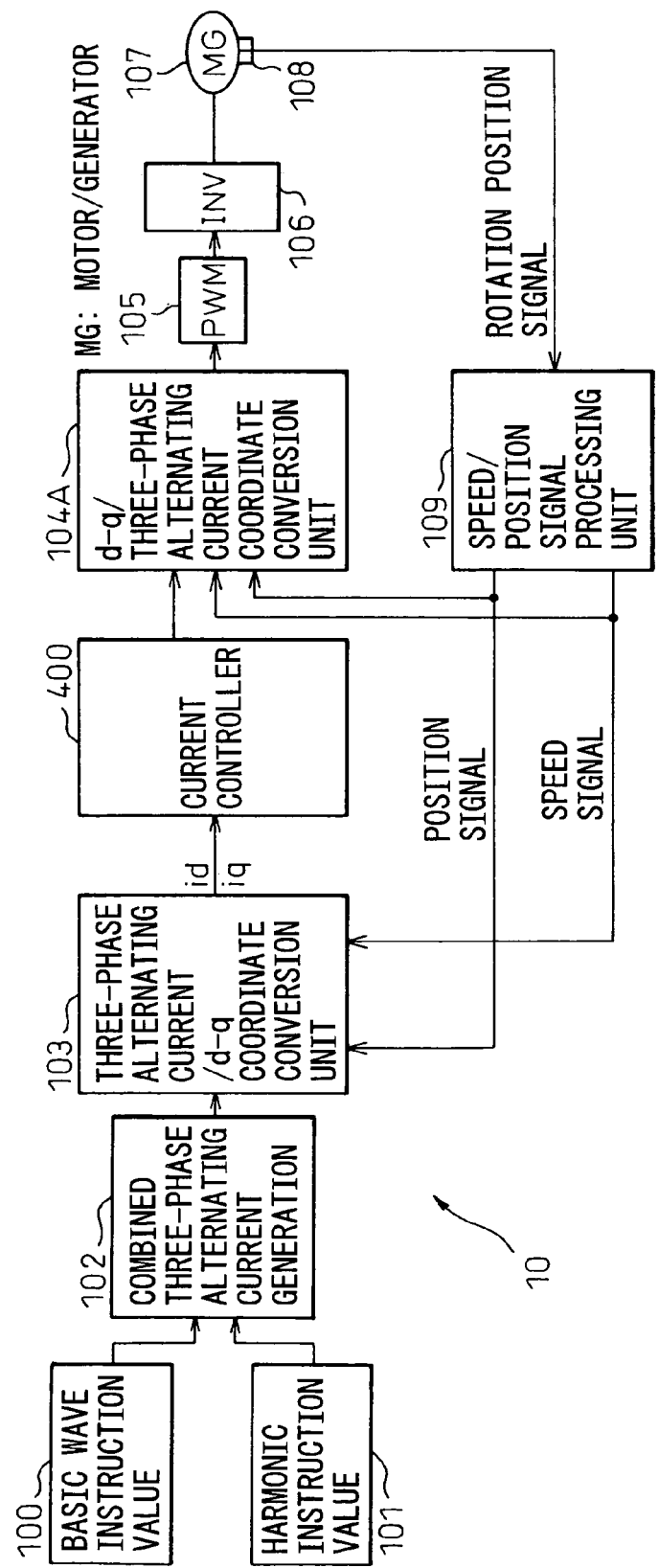
FIG. 7 is a block circuit diagram of a motor control circuit employing a magnetic sound change method according to still another embodiment of the present invention.

An example of a circuit for superimposing harmonic currents described above is shown in FIG. 7. This circuit changes the circuit shown in FIG. 3 to open control.

The instructions concerning the basic wave current and the harmonic currents output from the basic wave circuit block 100 and the harmonic circuit block 101 are input to the circuit block 102. The circuit block 102 adds the basic wave current value and harmonic current values of phases determined based on the input information for each phase and periodically calculates the combined three-phase alternating current value. The calculated combined three-phase alternating current value is converted in coordinates to the d-q axis system by the circuit block 103 for the coordinate conversion and adjusted in gain by the current amplifier 400, then output to the three-phase alternating current value at the circuit block 104A for the coordinates conversion.

The circuit block 104A generates the PWM control voltages of the different phases at the circuit block 105, intermittently controls the switching elements of the three-phase inverter 106 by this three-phase PWM control voltage, applies the output voltage of this three-phase inverter 106 to the stator coil of the three-phase synchronous machine 107 functioning as a generator, and makes the three-phase alternating current flowing through the three-phase synchronous machine 107 the sum of the basic wave current and harmonic currents having the frequencies, amplitudes, and phases designated by the circuit blocks 100 and 101.

The three-phase synchronous machine 107 has a built-in rotation angle sensor 108. The speed/phase signal processing use circuit block 109 extracts the speed signal and the position signal from the rotation position signal output from the rotation angle sensor 108 and inputs them to the circuit blocks 103 and 104A for coordinate conversion.

EXPERIMENTAL EXAMPLE

Figure 8:
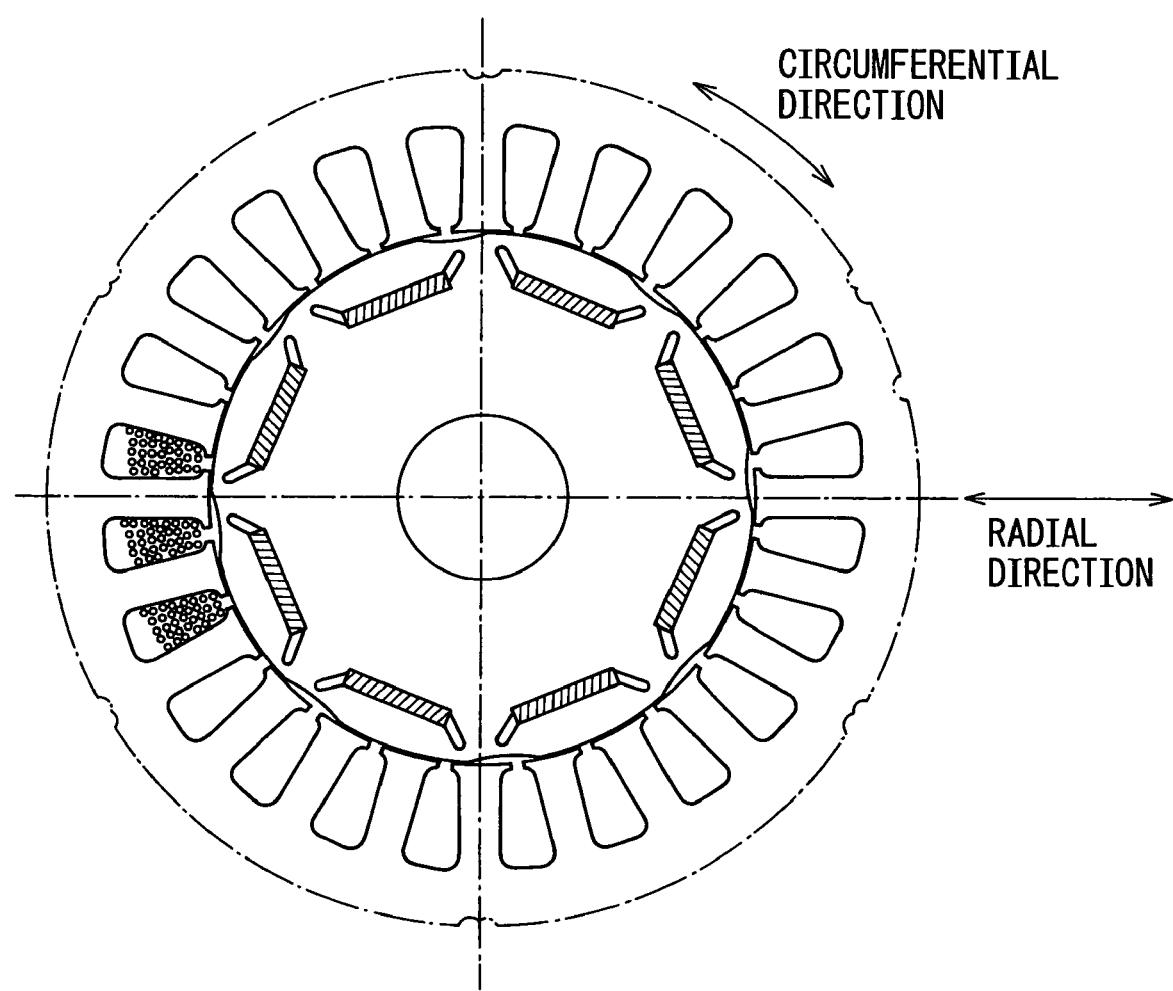
FIG. 8 is a schematic cross-sectional view in the radial direction of a three-phase synchronous machine used in an experiment.
Figure 9:
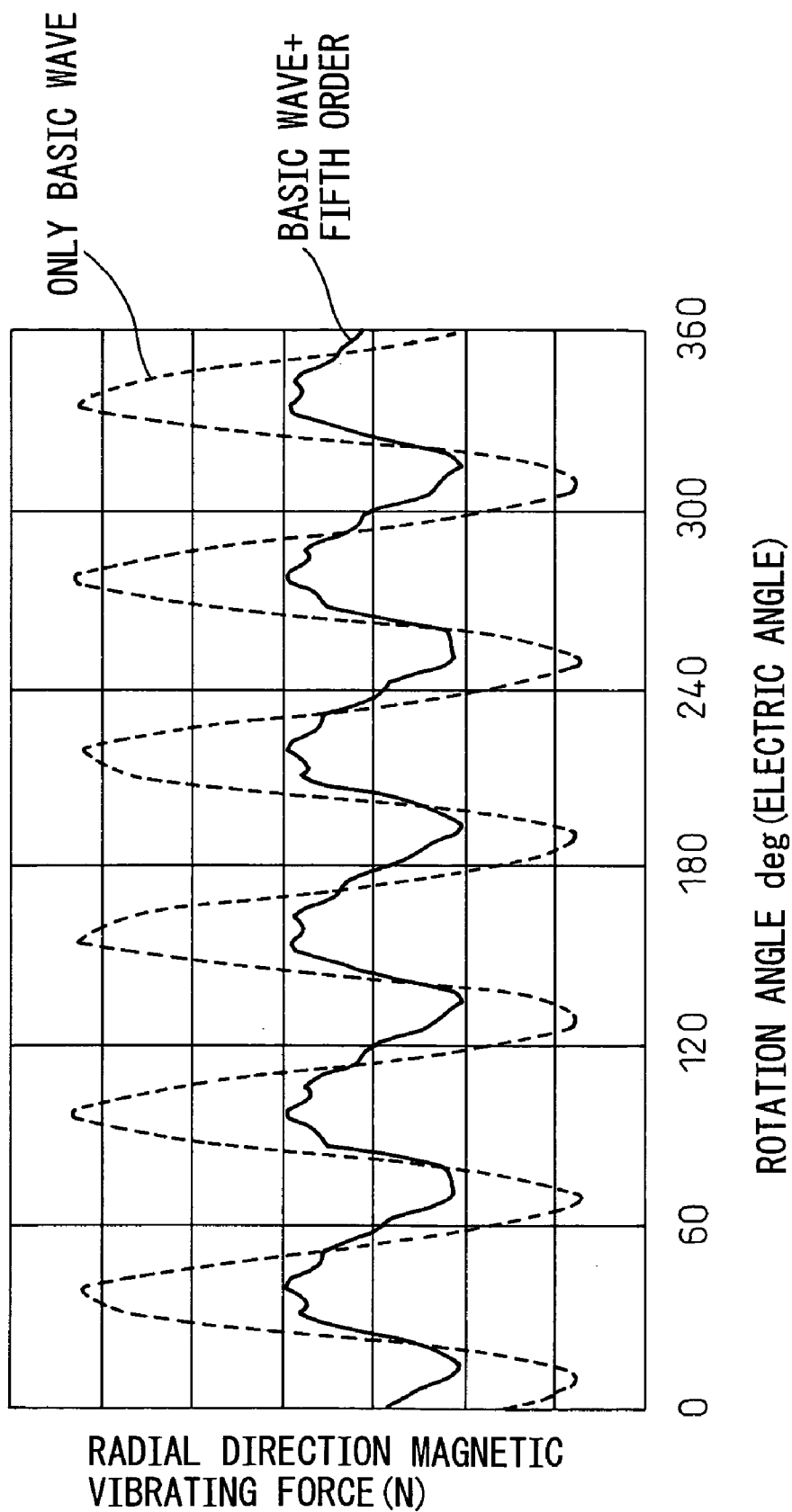
FIG. 9 is a waveform diagram of waveforms of radial direction vibrating forces obtained in an experiment using a three-phase synchronous machine of FIG. 8.

EM analysis for reduction of the magnetic sound was performed using the three-phase synchronous machine shown in FIG. 8 (8 poles, 24 slots, IPM). FIG. 9 shows the waveforms of the radial direction magnetic vibrating forces obtained when setting the basic frequency component of the stator current as 70A and setting the rotor phase angle to the state giving the maximum torque in a case of superimposing the radial direction vibration control use harmonic currents computed by the above equations, here, superposing the fifth order harmonic current 3A to the basic wave and not superposing any radial direction vibration control use harmonic current.

This vibrating force is the sum of the vibrating forces added to three teeth as the sum of three phases' worth. Superimposing the radial direction vibration control use harmonic currents can effectively reduce magnetomotive force.

The present invention is characterized in that n-th order magnetic sounds can be controlled by superimposing an (n−1)-th order radial direction vibration control use harmonic current having the inverse phase sequence as that of the basic wave and can be applied regardless of the number of poles and number of slots of the rotating machine. In the present example, the case where the number of teeth for every pole and every phase was 1 (24/8/3=1) was shown, therefore, 3 teeth's worth were summed up, but other cases are also possible. For example, in the case of 8 poles and 48 slots, when six teeth adjoining each other are summed up, three phases' worth is obtained. In the case of 8 poles and 96 slots, when 12 teeth adjoining each other are summed up, three phases' worth is obtained by three teeth adjoining each other. Further, in the case of concentrated coil of 12 poles and 18 slots etc., three phases' worth is obtained by three teeth adjoining each other.

(Modification)

In the above example of control, open control and feedback current control using target current values were explained, but it is possible to perform feedback control wherein the magnetic sound is directly detected by for example a microphone, the harmonic components of predetermined orders thereof are extracted, the deviations between these harmonic components and predetermined target values are found, these deviations are reduced to zero by computing the amplitudes and phases of the superimposed radial direction vibration control use harmonic currents corresponding to the deviations or finding them from maps, and the determined superimposed radial direction vibration control use harmonic currents are superimposed on the stator current.

In the same way as above, in place of directly detecting the magnetic sound by a microphone, it is also possible to perform feedback control similar to the above to reduce to a predetermined target value the output of a vibration sensor or a force detection sensor provided at the stator core, a search coil or a pickup coil for detecting the magnetic field, etc.

While the invention has been described with reference to specific embodiments chosen for purpose of illustration, it should be apparent that numerous modifications could be made thereto by those skilled in the art without departing from the basic concept and scope of the invention.

What we claim is:

1. A method of control of magnetic sound of an alternating current rotating machine comprising:

when designating an order of a basic frequency component of a multi-phase alternating current supplied to an armature of a multi-phase alternating current rotating machine as "1";

adding, to said multi-phase alternating current, an (n−1)-th order (n is a natural number) radial direction vibration control use harmonic current having an inverse phase sequence from said basic frequency component;

so as to change, among radial direction vibration comprised of vibration radially generated about an axis of a shaft of said alternating current rotating machine due to vibrating force generated by said alternating current rotating machine or input to said alternating current rotating machine from the outside, n-th order harmonic radial direction vibration components in comparison with a case of not adding said radial direction vibration control use harmonic currents;

detecting said harmonic current components supplied to said armature; and performing feedback control so that deviations of amplitude and phases between detected values of said harmonic current components and computed values of said radial direction vibration control use harmonic currents to be added to said multi-phase alternating current become 0 so as to obtain target values of said harmonic radial direction vibration components.

2. A method of control of magnetic sound of an alternating current rotating machine comprising:

when designating an order of a basic frequency component of a multi-phase alternating current supplied to an armature of a multi-phase alternating current rotating machine as "1";

adding, to said multi-phase alternating current, an (n−1)-th order (n is a natural number) radial direction vibration control use harmonic current having an inverse phase sequence from said basic frequency component;

so as to change, among radial direction vibration comprised of vibration radially generated about an axis of a shaft of said alternating current rotating machine due to vibrating force generated by said alternating current rotating machine or input to said alternating current rotating machine from the outside, n-th order harmonic radial direction vibration components in comparison with a case of not adding said radial direction vibration control use harmonic currents;

said adding step comprising:

detecting said harmonic radial direction vibration components or electrical parameters associated with the same, computing the amplitudes and phases of said radial direction vibration control use harmonic currents corresponding to the differences of said radial direction vibration components or electrical parameters associated with the same corresponding to the deviations between the detected values of said harmonic radial direction vibration components or the electrical parameters associated with the same and the target values of said harmonic radial direction vibration components or the electrical parameters associated with the same based on predetermined maps or equations showing relationships between said harmonic radial direction vibration components and said radial direction vibration control use harmonic currents, and adding the computed values of said radial direction vibration control use harmonic currents to said multi-phase alternating current.

* * * * *